United States Patent
Ojima et al.

(10) Patent No.: US 7,361,423 B2
(45) Date of Patent: Apr. 22, 2008

(54) FUEL CELL SYSTEM AND METHOD FOR DISCHARGING REACTION GAS FROM FUEL CELL

(75) Inventors: Kuniaki Ojima, Yuki (JP); Shinji Yoshikawa, Utsunomiya (JP); Yuji Matsumoto, Shioya-gun (JP); Junji Uehara, Utsunomiya (JP); Kenichiro Ueda, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 436 days.

(21) Appl. No.: 10/989,691

(22) Filed: Nov. 15, 2004

(65) Prior Publication Data

US 2005/0130000 A1 Jun. 16, 2005

(30) Foreign Application Priority Data

Nov. 17, 2003 (JP) .............................. 2003-386570

(51) Int. Cl.
*H01M 8/00* (2006.01)
*H01M 8/04* (2006.01)

(52) U.S. Cl. .............................. 429/13; 429/22; 429/23

(58) Field of Classification Search .................. 429/22, 429/34, 13, 23
See application file for complete search history.

(56) References Cited

U.S. PATENT DOCUMENTS 6,632,552 B2 * 10/2003 Yamanashi ................... 429/17

FOREIGN PATENT DOCUMENTS

| JP | 2000-243417 | * | 9/2000 |
|----|-------------|---|--------|
| JP | 2002-93438  |   | 3/2002 |
| JP | 2003-115314 |   | 4/2003 |
| JP | 2003-243020 |   | 8/2003 |

OTHER PUBLICATIONS

Japanese Office Action for Application No. 2003-386570, dated May 15, 2007.

* cited by examiner

*Primary Examiner*—Patrick Joseph Ryan
*Assistant Examiner*—Thomas H. Parsons
(74) *Attorney, Agent, or Firm*—Lahive & Cockfield, LLP; Anthony A. Laurentano

(57) ABSTRACT

A fuel cell system includes: a fuel cell which generates electrical power from a chemical reaction of a reaction gas; a discharge path for discharging the reaction gas supplied to the fuel cell; a discharge valve which is provided in the discharge path and discharges the reaction gas from the discharge path; and valve control units for controlling opening of the discharge valve, wherein the valve control units are adapted such that, since the discharge valve has been opened by a valve open command issued by one of the valve control units, the valve control units prohibit the discharge valve from being opened by a valve open command issued by any of the other valve control units until a predetermined time period elapses.

9 Claims, 14 Drawing Sheets

FUEL CELL SYSTEM AND METHOD FOR DISCHARGING REACTION GAS FROM FUEL CELL

BACKGROUND OF THE INVENTION

1. Field of the Invention

The present invention relates to a fuel cell system.

Priority is claimed on Japanese Patent Application No. 2003-386570, filed Nov. 17, 2003, the content of which is incorporated herein by reference.

2. Description of Related Art

One type of fuel cell is a fuel cell installed in a fuel cell vehicle and the like, and such a fuel cell generates electrical power by a chemical reaction of reaction gas. This type of fuel cell, for example, includes a fuel cell in which a solid polymer electrolyte membrane is sandwiched between an anode and a cathode. A fuel gas (e.g., hydrogen gas) is supplied to the anode, and an oxidizer gas (e.g., air containing oxygen) is supplied to the cathode, and chemical energy involved in the reduction in these reaction gases is extracted as electric energy.

In such a fuel cell, water is generated at the cathode side during the power generation, and a part of the generated water permeates to the anode side through the solid polymer electrolyte membrane. In addition, some of nitrogen in the air supplied to the cathode is mixed with the hydrogen gas in the anode through the solid polymer electrolyte membrane, although the amount of the infiltrated nitrogen gas is very small. Impurities at the anode side, such as water or nitrogen and the like, may make power generation of the fuel cell unstable.

In particular, the concentration of the impurities at the anode side tends to gradually increase in a circulation-type fuel cell system in which unreacted hydrogen discharged from the fuel cell is collected, mixed with fresh hydrogen gas, and supplied to the fuel cell again in order to increase the usage of hydrogen.

In this type of fuel cell, the impurities in the hydrogen gas are discharged by periodically opening a discharge valve in order to discharge hydrogen gas containing impurities from a hydrogen circulation path (see Japanese Unexamined Patent Application, First Publication No. 2000-243417, for example).

As a system which controls discharges of hydrogen gas containing impurities from a hydrogen circulation path by periodically opening a discharge valve, a system is known which includes a plurality of determining units for determining whether or not to open or close a discharge valve in part of the control flow of the system. The system determines whether or not to open or close the discharge valve based on a combination of decisions made by these determining units.

A fuel cell system is also known having a plurality of discharge valves, and the system includes at least one determining unit for determining whether or not to open or close the respective discharge valves, and a decision whether or not to open or close the discharge valves is made based on decisions made by each of the determining units.

However, in a conventional system having a plurality of determining units, when a valve is being opened or soon after the valve is opened based on a decision made by one of the determining units, another determining unit makes a decision to open the same discharge valve and the discharge valve is opened. Such a successive opening of a discharge valve would result in excessive discharging of hydrogen gas together with impurities, and the efficiency of power generation would deteriorate because it appears that the hydrogen consumption increases. In addition, in a fuel cell having a dilution device which dilutes hydrogen gas discharged from a hydrogen circulation path with a cathode off-gas which is the gas discharged from the cathode, it is difficult to control the concentration of the diluted hydrogen.

Furthermore, in a system including a plurality of determining units and a plurality of discharge valves, when a first discharge valve of the discharge valves is being opened or soon after the first discharge valve is opened based on a decision made by one of the determining units, another determining unit would make a decision to open any of the discharge valves, and according to the decision, opens a second discharge valve at the same time the first discharge valve is being opened or soon after the first discharge valve is opened. Such a successive or simultaneous opening of multiple discharge valves would cause excessive discharging of hydrogen gas together with impurities, and the efficiency of power generation deteriorates because it appears that the hydrogen consumption increases. In addition, in a fuel cell having a dilution device which dilutes hydrogen gas discharged from a hydrogen circulation path with a cathode off-gas which is the gas discharged from the cathode, it is difficult to control the concentration of the diluted hydrogen.

SUMMARY OF THE INVENTION

Accordingly, the present invention provides a fuel cell system which can properly set the operation timing of a discharge valve when the system includes a plurality of determining units.

In order to solve the above-identified problems, a first aspect of the present invention is directed to a fuel cell system including: a fuel cell which generates electrical power from a chemical reaction of a reaction gas; a discharge path for discharging the reaction gas supplied to the fuel cell; a discharge valve which is provided in the discharge path and discharges the reaction gas from the discharge path; and valve control units for controlling opening of the discharge valve, wherein the valve control units are adapted such that, since the discharge valve has been opened by a valve open command issued by one of the valve control units, the valve control units prohibit the discharge valve from being opened by a valve open command issued by any of the other valve control units until a predetermined time period elapses.

In this configuration, the discharge valve is prevented from being opened even if one valve open control unit instructs a valve to open until a predetermined time period has elapsed since discharge valve was opened in response to a valve open command issued by another valve open control unit. Thus, reaction gas containing impurities is prevented from being discharged excessively.

In the above-described fuel cell system, the predetermined time period is determined by a parameter which indicates a status of the reaction gas to be discharged from the discharge valve.

This enables modifying the above-described predetermined time period according to the operating status of the fuel cell.

According to a second aspect of the fuel cell system, the predetermined time period may be determined by a parameter which indicates a status of the reaction gas to be discharged from the discharge valve.

In the above-described fuel cell system, each of the valve control units may include a first valve open command control unit which issues a valve open command at a predetermined time interval and a second valve open command control unit which issues a valve open command when it is determined that stability of the power generation in the fuel cell has decreased.

In the above-described fuel cell system, the fuel cell may include fuel cell units, and the second valve open command control unit is adapted to determine that the stability of the power generation in the fuel cell has decreased when the lowest voltage among the fuel cell voltages of the fuel cell units falls below a predetermined lower-limit voltage.

In the above-described fuel cell system, each of the valve control units may include a first valve open command control unit which issues a valve open command when it is determined that the power generation in the fuel cell is stable and a second valve open command control unit which issues a valve open command when it is determined that stability of the power generation in the fuel cell has decreased.

A third embodiment of the present invention is directed to a fuel cell system including: a fuel cell which generates electrical power from a chemical reaction of a reaction gas; a discharge path for discharging the reaction gas supplied to the fuel cell; a first discharge valve and a second discharge valve which are provided in the discharge path and discharge the reaction gas from the discharge path; and a first discharge valve control unit for controlling opening of the first discharge valve; and a second discharge valve control unit for controlling opening of the second discharge valve; and wherein the first discharge valve control unit is adapted to prohibit the first discharge valve from being opened until a first predetermined time period elapses since at least one of the first discharge valve and the second discharge valve has been opened, and the second discharge valve control unit is adapted to prohibit the second discharge valve from being opened until a second predetermined time period elapses since at least one of the first discharge valve and the second discharge valve has been opened.

A fourth embodiment of the present invention is directed to a method for discharging a reaction gas from a fuel cell which includes a discharge valve and valve control units, including the steps of: opening the discharge valve by issuing a valve open command from one of the valve control units; and prohibiting the discharge valve from being opened by a valve open command issued by any of the other valve control units until a predetermined time period elapses since the discharge valve has been opened by the valve open command issued by the one of the valve control units.

The above-mentioned method may includes the step of determining the predetermined time period by a parameter which indicates a status of the reaction gas to be discharged from the discharge valve.

In the above-mentioned method, each of the valve control units may include a first valve open command control unit which issues a valve open command at a predetermined time interval and a second valve open command control unit which issues a valve open command when it is determined that stability of the power generation in the fuel cell has decreased.

In the above-mentioned method, the fuel cell may include fuel cell units, and the second valve open control unit is adapted to determine that the stability of the power generation in the fuel cell has decreased when the lowest voltage among the fuel cell voltages of the fuel cell units falls below a predetermined lower-limit voltage.

In the above-mentioned method, each of the valve control units may include a first valve open command control unit which issues a valve open command when it is determined that the power generation in the fuel cell is stable and a second valve open command control unit which issues a valve open command when it is determined that stability of the power generation in the fuel cell has decreased.

A fifth embodiment of the present invention is directed to a method for discharging a reaction gas from a fuel cell which includes a first discharge valve and a second discharge valve, including the steps of: opening at least one of the first discharge valve and the second discharge valve to discharge the reaction gas; and prohibiting the first discharge valve from being opened until a first predetermined time period elapses since at least one of the first discharge valve and the second discharge valve has been opened, and prohibiting the second discharge valve from being opened until a second predetermined time period elapses since at least one of the first discharge valve and the second discharge valve has been opened.

According to the first aspect of the present invention, the efficiency of electrical power generation can be improved since excessive discharging of reaction gas containing impurities can be prevented.

According to the second aspect of the present invention, excessive discharging of reaction gas containing impurities can be prevented more properly since a valve open interval of a discharge valve can be changed according to the operating status of the fuel cell.

DETAILED DESCRIPTION OF THE INVENTION

Hereinafter, various embodiments of a fuel cell system according to the present invention will be described with reference to FIGS. 1 to 18.

First Embodiment

First, a first embodiment of a fuel cell system according to the present invention will be explained with reference to FIGS. 1 to 3.

Figure 1:
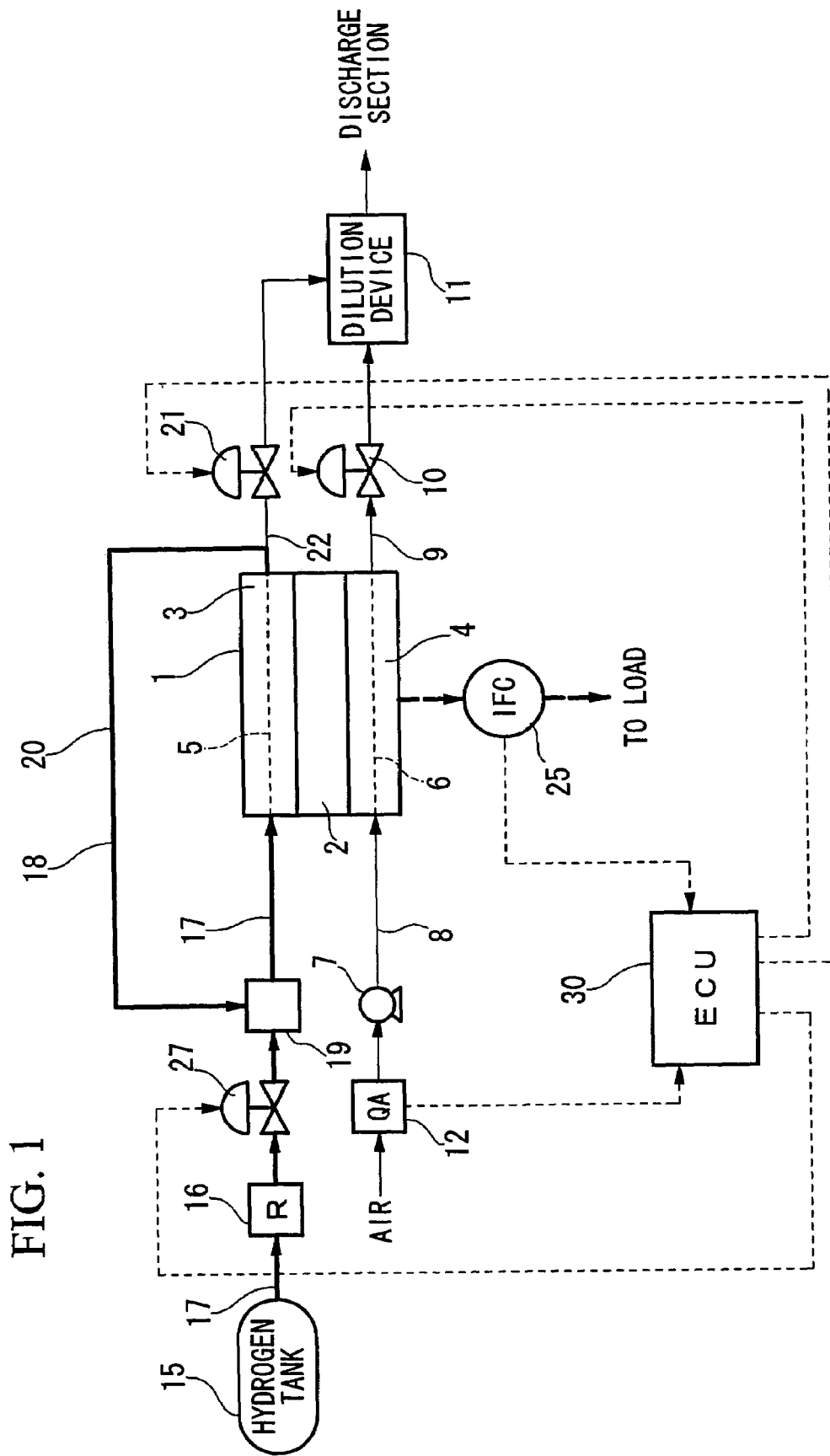
FIG. 1 is a schematic diagram of a fuel cell system having a fuel cell system according to the present invention (first embodiment)

FIG. 1 is schematic diagram illustrating a fuel cell system having the fuel cell system according to the present invention, and this fuel cell is mounted on a fuel cell vehicle in this example.

A fuel cell 1 generates electrical power from a chemical reaction of reaction gases, and the fuel cell 1 includes a plurality of cells, and each cell includes, for example, a solid polymer electrolyte membrane 2 made of solid polymer ion-exchange membrane and the like sandwiched between an anode 3 and a cathode 4 (in FIG. 1, only one cell is shown). When hydrogen gas (reaction gas) is supplied to a reaction gas communication path 5 of the anode 3 as a fuel gas, and air containing oxygen (reaction gas) is supplied to a reaction gas communication path 6 of the cathode 4 as an oxidizer gas; hydrogen ion generated by a catalytic reaction in the anode 3 moves to the cathode 4 through the solid polymer electrolyte membrane 2, and reacts with oxygen in an electrochemical reaction in the cathode 4 to generate electrical power, and water is synthesized. The generated water is present at the anode side since some of the water generated at the cathode side back-diffuses to the anode through the solid polymer electrolyte membrane 2.

Air is compressed to a predetermined pressure by a compressor 7, e.g., a super charger (S/C), and is supplied to the reaction gas communication path 6 of the cathode 4 in the fuel cell 1 through an air supply path 8. The air supplied to the fuel cell 1 is consumed in power generation, is discharged from the fuel cell 1 to an air discharge path 9 together with generated water present at the cathode side, and is led to a dilution device 11 via a pressure control valve 10. Hereinafter, the air supplied to the fuel cell 1 is referred to as a "supplied air", and the air discharged from the fuel cell 1 is referred to as an "discharged air". An air flow-rate detecting sensor 12 is provided upstream from the compressor 7 in the air supply path 8 which detects weight-flow rate (hereinafter, abbreviated as "air flow rate") QA of the air supplied to the fuel cell 1.

Hydrogen gas is supplied from a hydrogen tank 15, and passes through a hydrogen gas supply path 17. On route, the hydrogen gas is decompressed to a predetermined pressure by a regulator 16, and the flow rate of the hydrogen is controlled to a predetermined flow-rate by a flow rate control valve 27. The hydrogen gas is then supplied to the reaction gas communication path 5 of the anode 3 in the fuel cell 1 via an ejector 19. The unreacted hydrogen gas which has not been consumed in power generation is discharged from the fuel cell 1 as anode off-gas (residual reaction gas), and is aspirated by the ejector 19 through an anode off-gas path 18, mixed with fresh hydrogen gas supplied from a hydrogen tank 15, and supplied to the anode 3 of the fuel cell 1 again. In other words, the anode off-gas discharged from the fuel cell 1 passes through the anode off-gas path 18 and the hydrogen gas supply path 17 which is located downstream from the ejector 19, and circulates within the fuel cell 1. It should be noted that the anode off-gas path 18 and the hydrogen gas supply path 17 downstream from the ejector 19 defines a fuel gas circulating path 20 in this embodiment.

An anode off-gas discharge path (discharge path) 22 including a discharge valve 21 is branched from the anode off-gas path 18 and is connected to the dilution device 11. In the dilution device 11, anode off-gas discharged through the anode off-gas discharge path 22 is diluted with the discharged air discharged through the air discharge path 9, and discharged from the system.

Electrical power generated in the fuel cell 1 is supplied to a load, e.g., a vehicle drive motor, and the output IFC of the generated power is detected by an ammeter 25.

The fuel cell 1 is controlled by an electrical control unit (hereinafter abbreviated as "ECU") 30, and accordingly, the ECU 30 receives various signals from other components, including the air flow-rate detecting sensor 12 and the ammeter 25 in order to control the number of revolutions of the compressor 7, valve opening positions of the flow rate control valve 27 and the pressure control valve 10, opening or closing of the discharge valve 21, and the like.

As described previously, in the fuel cell system which is configured in the above-described manner, the concentration of impurities (e.g., water or nitrogen) in the hydrogen gas circulating through the fuel gas circulating path 20 may be increased during continuous operation, and power generation in the fuel cell 1 may become unstable.

For this reason, in this fuel cell system, when a determining unit $D_A$ determines that the fuel cell system has been operated continuously for a certain time period, and in which a determining unit $D_B$ determines that power generation in the fuel cell 1 has become unstable, the system determines that discharge of impurities is necessary, and opens the discharge valve 21 to discharge anode off-gas containing impurities from the anode off-gas path 18 to the dilution device 11 through the anode off-gas discharge path 22 (hereinafter, this processing is referred to as a "impurities discharging process"). In this manner, the system maintains the concentration of impurities in hydrogen gas passing through the anode 3 of the fuel cell 1 to a predetermined level or lower, thus stabilizing power generation in the fuel cell 1. It should be noted that a decision made by the determining unit $D_B$ whether or not power generation becomes unstable may be based on, for example, whether or not the lowest cell voltage of cell voltage(s) of the at least one cell in the fuel cell 1 drops below a preset lower limit voltage.

In the fuel cell system in the first embodiment, in particular, when the determining unit $D_A$ determines that discharge of impurities is necessary and issues a command to open the discharge valve 21 to execute an impurities discharging process, the discharge valve 21 is prevented from being opened until a predetermined time period T2 elapses since the discharge valve 21 is opened in this impurities discharging process even if the determining unit $D_B$ determines that discharge of impurities is necessary and issues a command to open the discharge valve 21. In addition, when the determining unit $D_B$ determines that discharge of impurities is necessary and issues a command to open the discharge valve 21 to execute an impurities discharging process, the discharge valve 21 is prevented from being opened until a predetermined time period T1 elapses since the discharge valve 21 is opened in this impurities discharging process, even if the determining unit $D_A$ determines that discharge of impurities is necessary and issues a command to open the discharge valve 21. This can prevent excessive discharging of anode-off gas containing impurities.

Next, the flow of the impurities discharging process in the first embodiment will be explained with reference to the flow chart of FIG. 2.

First, in step S101, it is determined whether or not the determining unit $D_A$ has determined that discharge of impurities is necessary and issued a command to open the discharge valve 21.

If the decision made in step S101 is "YES", i.e., an open command has been issued by the determining unit $D_A$, the flow proceeds to step S102 in which it is determined whether or not a predetermined time period T1 has elapsed since the determining unit $D_B$ has determined that discharge of impurities is necessary and opened the discharge valve 21.

If the decision made in step S102 is "YES", i.e., the predetermined time period T1 has elapsed since the discharge valve 21 has been opened based on a decision made by the determining unit $D_B$, the flow proceeds to step S103 in which the discharge valve 21 is opened, and this routine ends. This means that in this case, the discharge valve 21 is opened and an impurities discharging process is executed immediately after it is determined by the determining unit $D_A$ that discharge of impurities is necessary.

On the other hand, if the decision made in step S102 is "NO", i.e., the predetermined time period T1 has not elapsed since the discharge valve 21 has been opened based on a decision made by the determining unit $D_B$, the flow proceeds to step S104 in which the discharge valve 21 remains closed. That is, the discharge valve 21 is prevented from being opened, and this routine ends. In this case, as shown in the timing chart of FIG. 3, even if the determining unit $D_A$ determines that discharge of impurities is necessary, the discharge valve 21 is prevented from being opened until the predetermined time period T1 elapses after the discharge valve 21 has been opened based on a decision made by the determining unit $D_B$. The discharge valve 21 is allowed to be opened and an impurities discharging process is executed based on the decision made by the determining unit $D_A$ after the predetermined time period T1 elapses.

In addition, if the decision made in step S101 is "NO", i.e., an open command has not been issued by the determining unit $D_A$, the flow proceeds to step S105 in which it is determined whether or not the determining unit $D_B$ has determined that discharge of impurities is necessary and issued a command to open the discharge valve 21.

If the decision made in step S105 is "NO", i.e., an open command has not been issued by the determining unit $D_B$, the flow proceeds to step S107 in which the discharge valve 21 remains closed, and this routine ends.

If the decision made in step S105 is "YES", i.e., an open command has been issued by the determining unit $D_B$, the flow proceeds to step S106 in which it is determined whether or not a predetermined time period T2 has elapsed since the determining unit $D_A$ has determined that discharge of impurities is necessary and opened the discharge valve 21.

If the decision made in step S106 is "YES", i.e., the predetermined time period T2 has elapsed since the discharge valve 21 has been opened based on a decision made by the determining unit $D_A$, the flow proceeds to step S103 in which the discharge valve 21 is opened, and this routine ends. This means that in this case, the discharge valve 21 is opened and an impurities discharging process is executed immediately after it is determined by the determining unit $D_B$ that discharge of impurities is necessary.

On the other hand, if the decision made in step S106 is "NO", i.e., the predetermined time period T2 has not elapsed since the discharge valve 21 has been opened based on a decision made by the determining unit $D_A$, the flow proceeds to step S107 in which the discharge valve 21 remains closed. That is, the discharge valve 21 is prevented from being opened, and this routine ends. In this case, as shown in the timing chart of FIG. 3, even if the determining unit $D_B$ determines that discharge of impurities is necessary, the discharge valve 21 is prevented from being opened until the predetermined time period T2 elapses after the discharge valve 21 has been opened based on a decision made by the determining unit $D_A$. The discharge valve 21 is allowed to be opened and an impurities discharging process is executed based on the decision made by the determining unit $D_B$ after the predetermined time period T2 elapses.

Figure 2:
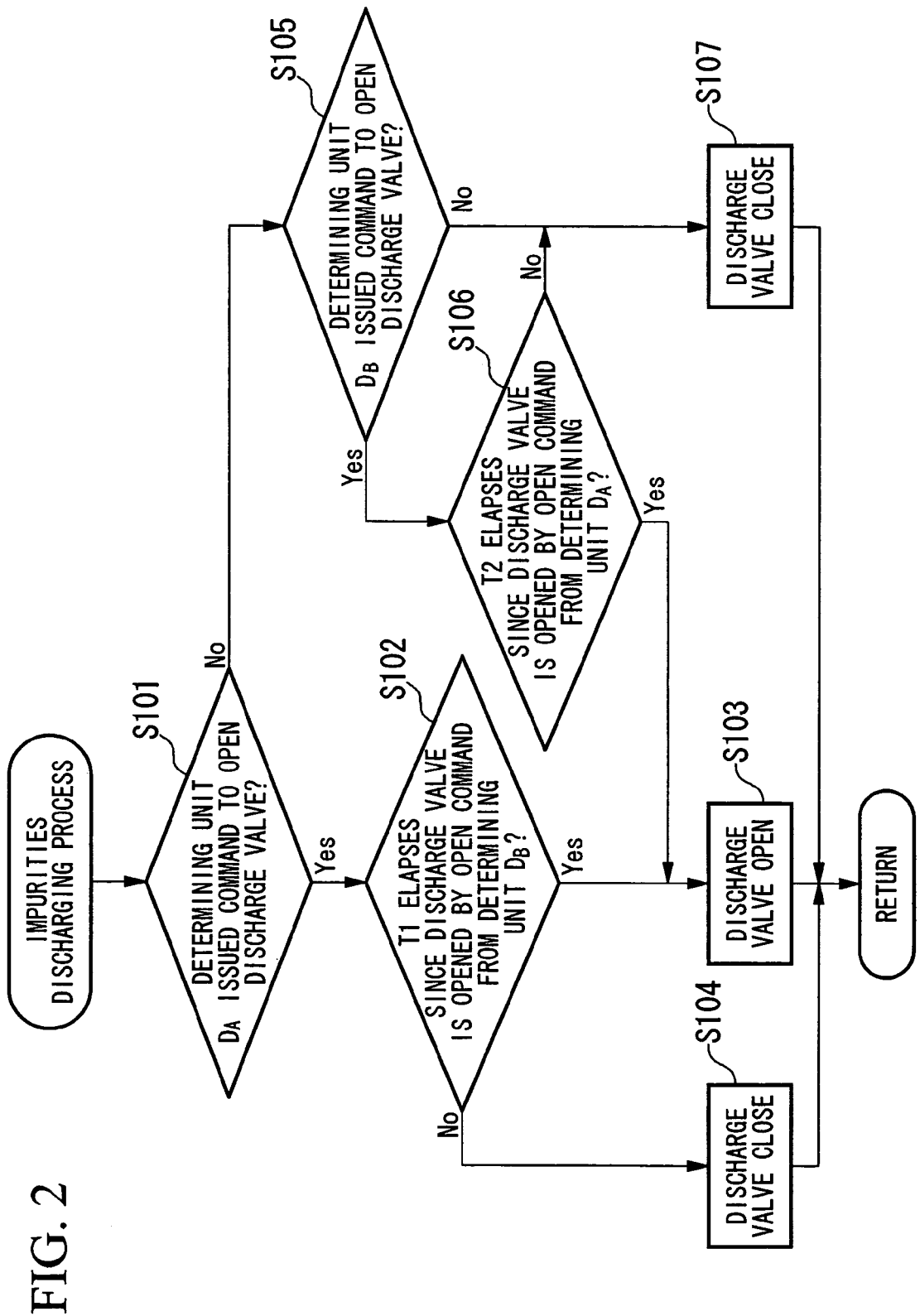
FIG. 2 is a flow chart illustrating an impurities discharging process according to the first embodiment of the present invention.
Figure 3:
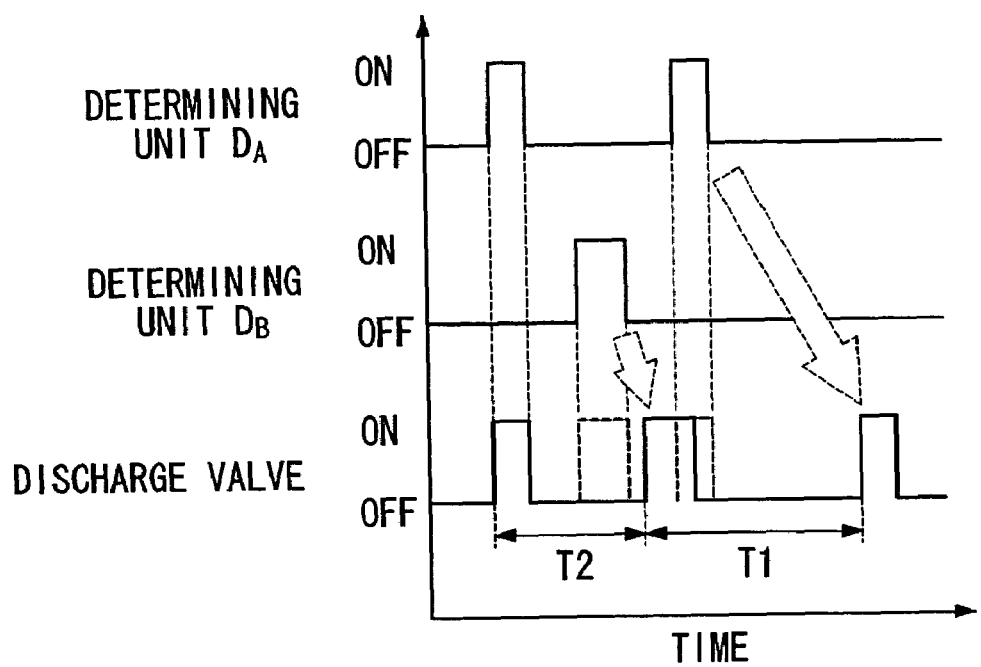
FIG. 3 is a timing chart of the first embodiment.
Figure 4:
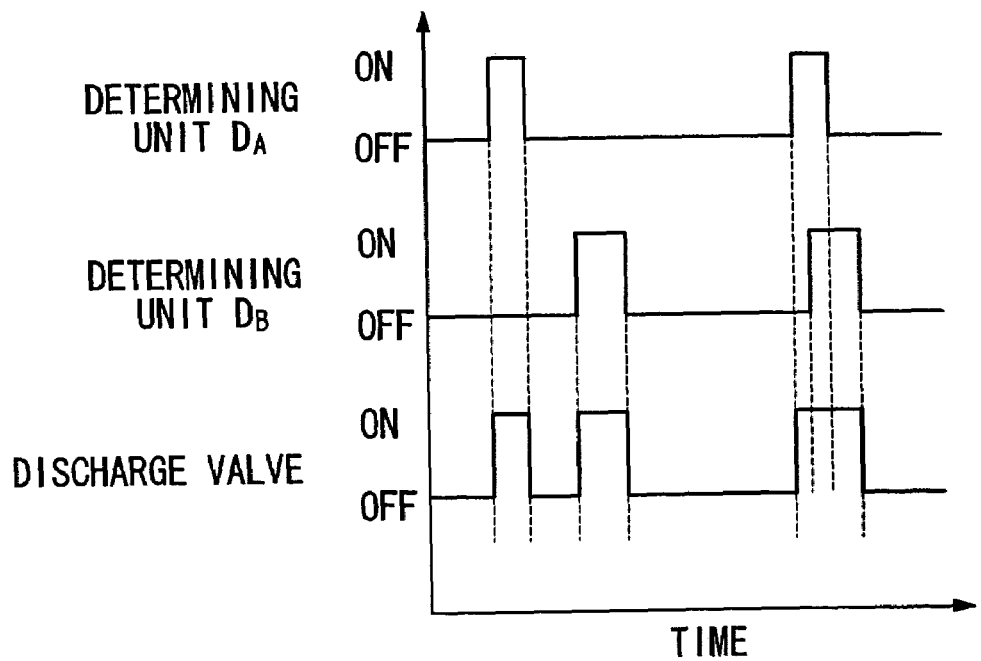
FIG. 4 is a timing chart of a comparative example of the first embodiment.

FIG. 4 is a timing chart of a comparative example of the flow chart shown in FIG. 2 in which the steps S102 and S106 are omitted. In this comparative example, since the impurities discharging process based on a decision made by the determining unit $D_A$ and the impurities discharging process based on a decision made by the determining unit $D_B$ are executed independently, an impurities discharging process may be executed in a short time after the previous impurities discharging process is completed, or impurities discharging processes may be continuously executed for a long time based on decisions made by the two determining units. Therefore, anode off-gas may be excessively discharged, resulting in a deteriorated efficiency of power generation, or an increased hydrogen gas may flow into the dilution device 11, which may cause an unstable hydrogen concentration after hydrogen is diluted.

According to the discharge system of the first embodiment, since excessive discharging of anode off-gas containing impurities can be prevented, the amount of hydrogen gas which has not been consumed in the power generation and is discharged together with the impurities can be reduced compared to the conventional methods, and the efficiency of power generation can be improved. Furthermore, since the amount of hydrogen gas flowing into the dilution device 11 can be optimized, it becomes possible to stabilize the hydrogen concentration after hydrogen is diluted.

In this first embodiment, because the ECU 30 executes the process in step S101 or S105, two valve open control units which control opening of the discharge valve 21 can be realized.

Second Embodiment

Next, the fuel cell system according to a second embodiment of the present invention will be explained with reference to FIGS. 5 to 7.

The major difference in the discharge systems for a fuel cell between the first and the second embodiment is that the discharge systems of the second embodiment includes two discharge valves for discharging anode off-gas.

Figure 5:
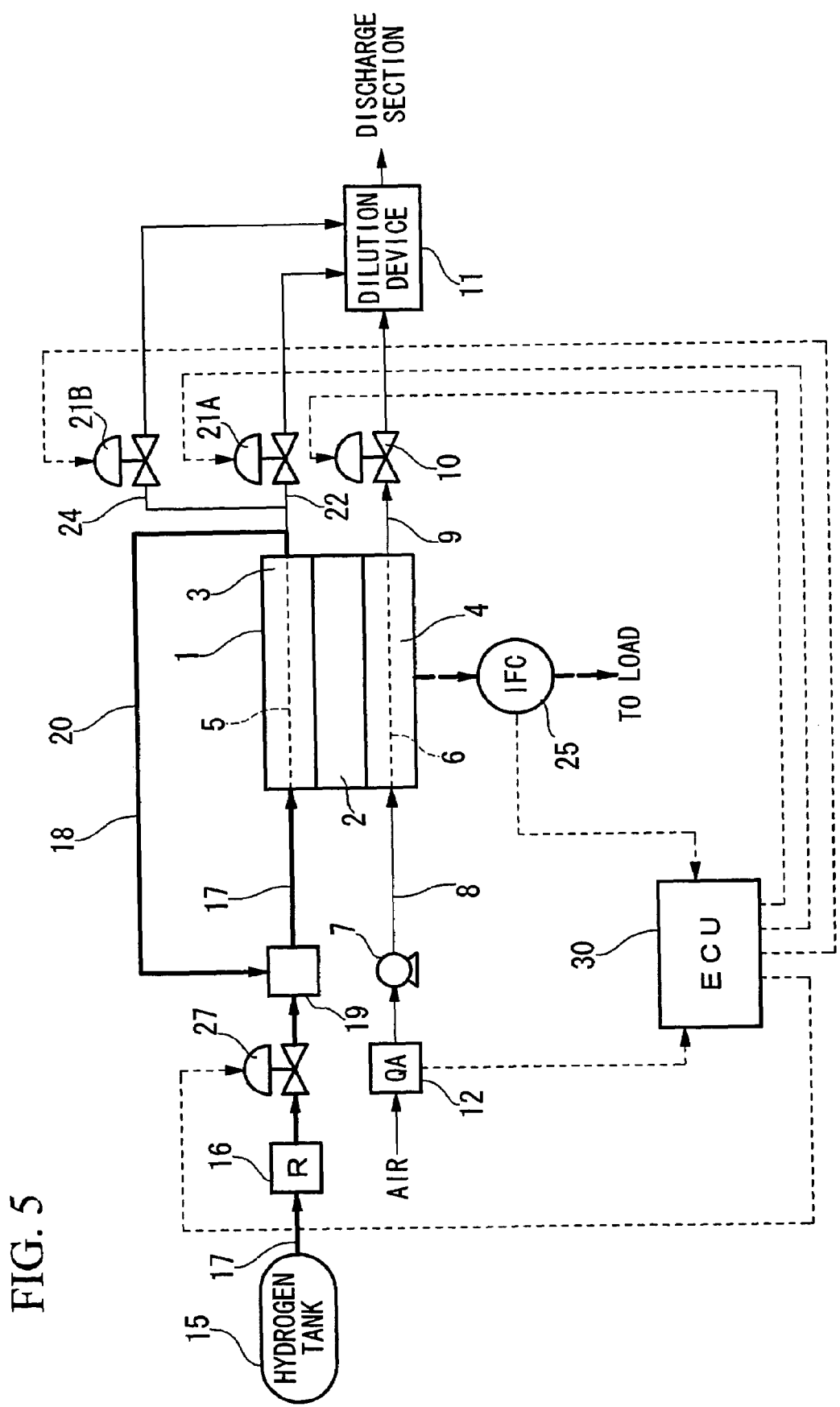
FIG. 5 is a schematic diagram of a fuel cell system having a fuel cell system according to the present invention (second embodiment)

More specifically, as shown in FIG. 5, an anode off-gas discharge path (discharge path) 22 including the first discharge valve 21A is branched from the anode off-gas path 18 and is connected to the dilution device 11. Furthermore, an anode off-gas discharge path 24 including the second discharge valve 21B is branched from a portion of the anode off-gas discharge path 22 located upstream from the first discharge valve 21A, and the anode off-gas discharge path 24 is also connected to the dilution device 11. In the dilution device 11, anode off-gas discharged from the anode off-gas discharge paths 22 and 24 is diluted with the discharged air discharged from the air discharge path 9, and discharged from the system.

The first discharge valve 21A is the valve which is opened when the determining unit $D_A$ determines that discharge of impurities is necessary, and the second discharge valve 21B is the valve which is opened when the determining unit $D_B$ determines that discharge of impurities is necessary.

Other configurations are the same as the fuel cell system of the first embodiment, the same reference characters denote the corresponding elements in the drawings; thus the description of such elements is omitted.

In the fuel cell system of the second embodiment, when the determining unit $D_A$ determines that discharge of impurities is necessary and issues a command to open the first discharge valve 21A to execute an impurities discharging process, the second discharge valve 21B is prevented from being opened until the predetermined time period T2 elapses since the first discharge valve 21A is opened in this impurities discharging process even if the determining unit $D_B$ determines that discharge of impurities is necessary and issues a command to open the second discharge valve 21B. When the determining unit $D_B$ determines that discharge of impurities is necessary and issues a command to open the second discharge valve 21B to execute an impurities discharging process, the first discharge valve 21A is prevented from being opened until a predetermined time period T1 elapses since the second discharge valve 21B is opened in this impurities discharging process even if the determining unit $D_A$ determines that discharge of impurities is necessary and issues a command to open the first discharge valve 21A. This can prevent excessive discharging of anode-off gas containing impurities.

Next, the flow of the impurities discharging process in the second embodiment will be explained with reference to the flow chart of FIG. 6.

First, in the step 201, it is determined whether or not the determining unit $D_A$ has determined that discharge of impurities is necessary and issued a command to open the first discharge valve 21A.

If the decision made in step S201 is "NO", i.e., an open command has not been issued by the determining unit $D_A$, the flow proceeds to step S202 in which the first discharge valve 21A remains closed.

If the decision made in step S201 is "YES", i.e., an open command has been issued by the determining unit $D_A$, the flow proceeds to step S203 in which it is determined whether or not a predetermined time period T1 has elapsed since the determining unit $D_B$ has determined that discharge of impurities is necessary and opened the second discharge valve 21B.

If the decision made in step S203 is "YES", i.e., the predetermined time period T1 has elapsed since the second discharge valve 21B has been opened based on a decision made by the determining unit $D_B$, the flow proceeds to step S204 in which the first discharge valve 21A is opened. This means that in this case, the first discharge valve 21A is opened and an impurities discharging process is executed immediately after it is determined by the determining unit $D_A$ that discharge of impurities is necessary.

On the other hand, if the decision made in step S203 is "NO", i.e., the predetermined time period T1 has not elapsed since the second discharge valve 21B has been opened based on a decision made by the determining unit $D_B$, the flow proceeds to step S202 in which the first discharge valve 21A remains closed. That is, the first discharge valve 21A is prevented from being opened. In this case, as shown in the timing chart of FIG. 7, even if the determining unit $D_A$ determines that discharge of impurities is necessary, the first discharge valve 21A is prevented from being opened until the predetermined time period T1 elapses after the second discharge valve 21B has been opened based on a decision made by the determining unit $D_B$. The first discharge valve 21A is allowed to be opened and an impurities discharging process is executed based on the decision made by the determining unit $D_A$ after the predetermined time period T1 elapses.

After the process of step S202 or S204 is executed, the flow proceeds to step S205 in which it is determined whether or not the determining unit $D_B$ has determined that discharge of impurities is necessary and issued a command to open the second discharge valve 21B.

If the decision made in step S205 is "NO", i.e., an open command has not been issued by the determining unit $D_B$, the flow proceeds to step S208 in which the second discharge valve 21B remains closed, and this routine ends.

If the decision made in step S205 is "YES", i.e., an open command has been issued by the determining unit $D_B$, the flow proceeds to step S206 in which it is determined whether or not a predetermined time period T2 has elapsed since the determining unit $D_A$ has determined that discharge of impurities is necessary and opened the first discharge valve 21A.

If the decision made in step S206 is "YES", i.e., the predetermined time period T2 has elapsed since the first discharge valve 21A has been opened based on the decision made by the determining unit $D_A$, the flow proceeds to step S207 in which the second discharge valve 21B is opened, and this routine ends. This means that in this case, the second discharge valve 21B is opened and an impurities discharging process is executed immediately after it is determined by the determining unit $D_B$ that discharge of impurities is necessary.

On the other hand, if the decision made in step S206 is "NO", i.e., the predetermined time period T2 has not elapsed since the first discharge valve 21A has been opened based on the decision made by the determining unit $D_A$, the flow proceeds to step S208 in which the second discharge valve 21B remains closed. That is, the second discharge valve 21B is prevented from being opened, and this routine ends. In this case, as shown in the timing chart of FIG. 7, even if the determining unit $D_B$ determines that discharge of impurities is necessary, the second discharge valve 21B is prevented from being opened until a predetermined time period T2 elapses after the first discharge valve 21A has been opened based on a decision made by the determining unit $D_A$. The second discharge valve 21B is allowed to be opened and the impurities discharging process is executed based on a decision made by the determining unit $D_B$ after the predetermined time period T2 elapses.

Figure 6:
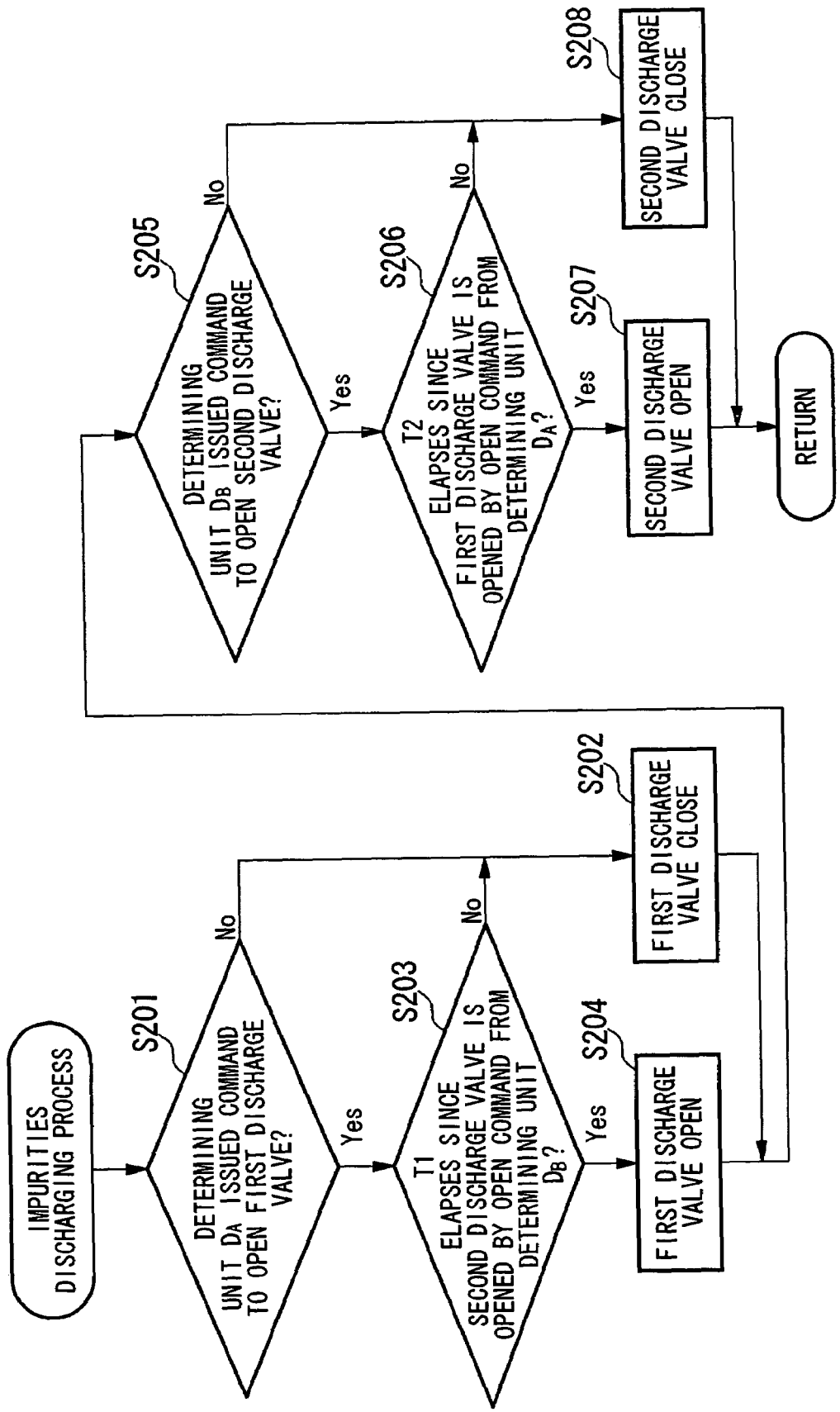
FIG. 6 is a flow chart illustrating an impurities discharging process according to the second embodiment of the present invention.
Figure 7:
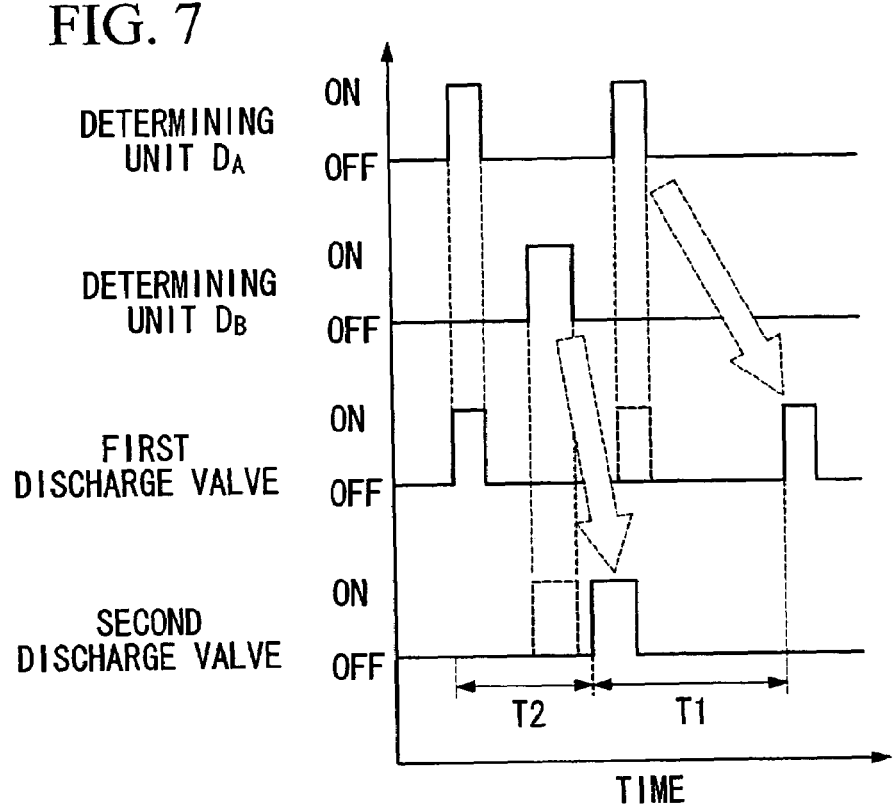
FIG. 7 is a timing chart of the second embodiment.
Figure 8:
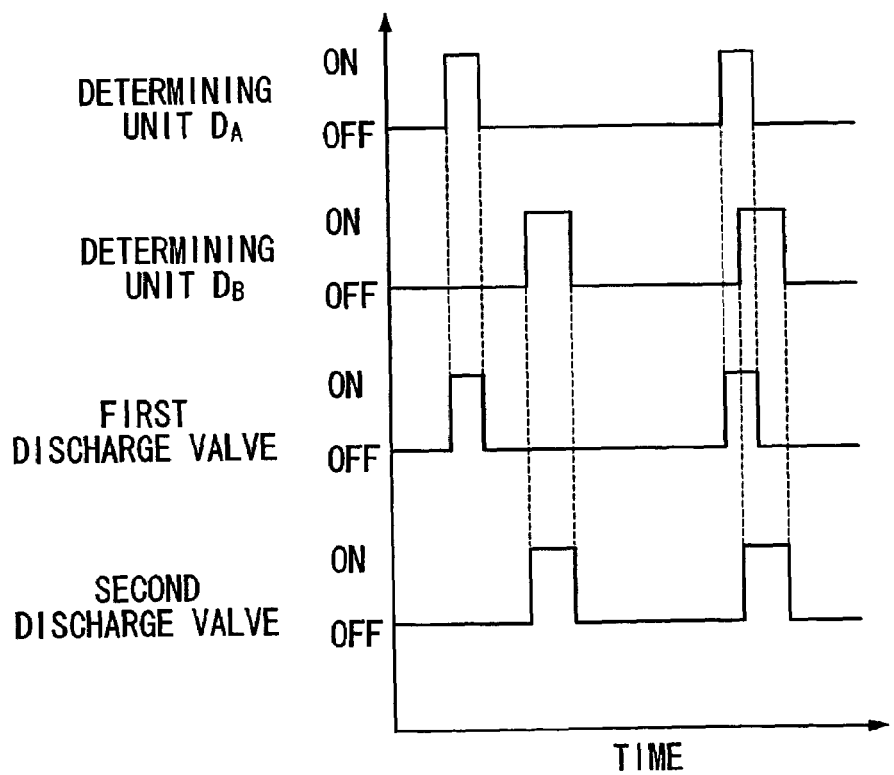
FIG. 8 is a timing chart of a comparative example of the second embodiment.

FIG. 8 is a timing chart of a comparative example of the flow chart shown in FIG. 6 in which the steps S203 and S206 are omitted. In this comparative example, since the impurities discharging process executed based on a decision made by the determining unit $D_A$ and the impurities discharging process executed based on a decision made by the determining unit $D_B$ are executed independently, an impurities discharging process using the second discharge valve 21B may be executed in a short time after an impurities discharging process using the first discharge valve 21A is completed, or an impurities discharging process using the first discharge valve 21A and an impurities discharging process using the second discharge valve 21B may executed sequentially. Therefore, anode off-gas may be excessively discharged, resulting in a deteriorated efficiency of power generation, or an increased hydrogen gas may flow into the dilution device 11, which may cause an unstable hydrogen concentration after hydrogen is diluted.

According to the discharge system of the second embodiment, since excessive discharging of anode off-gas containing impurities can be prevented, the amount of hydrogen gas which has not been consumed in the power generation and is discharged together with the impurities can be reduced compared to the conventional methods, and the efficiency of power generation can be improved. Furthermore, since the amount of hydrogen gas flowing into the dilution device 11 can be optimized, it becomes possible to stabilize the hydrogen concentration after hydrogen is diluted.

In this second embodiment, because the ECU 30 executes the process in step S201, a valve open control unit which controls opening of the first discharge valve 21A can be realized. At the same time, because the ECU 30 executes the process in step S205, another control unit which controls opening of the second discharge valve 21B can be realized.

Third Embodiment

Figure 10:
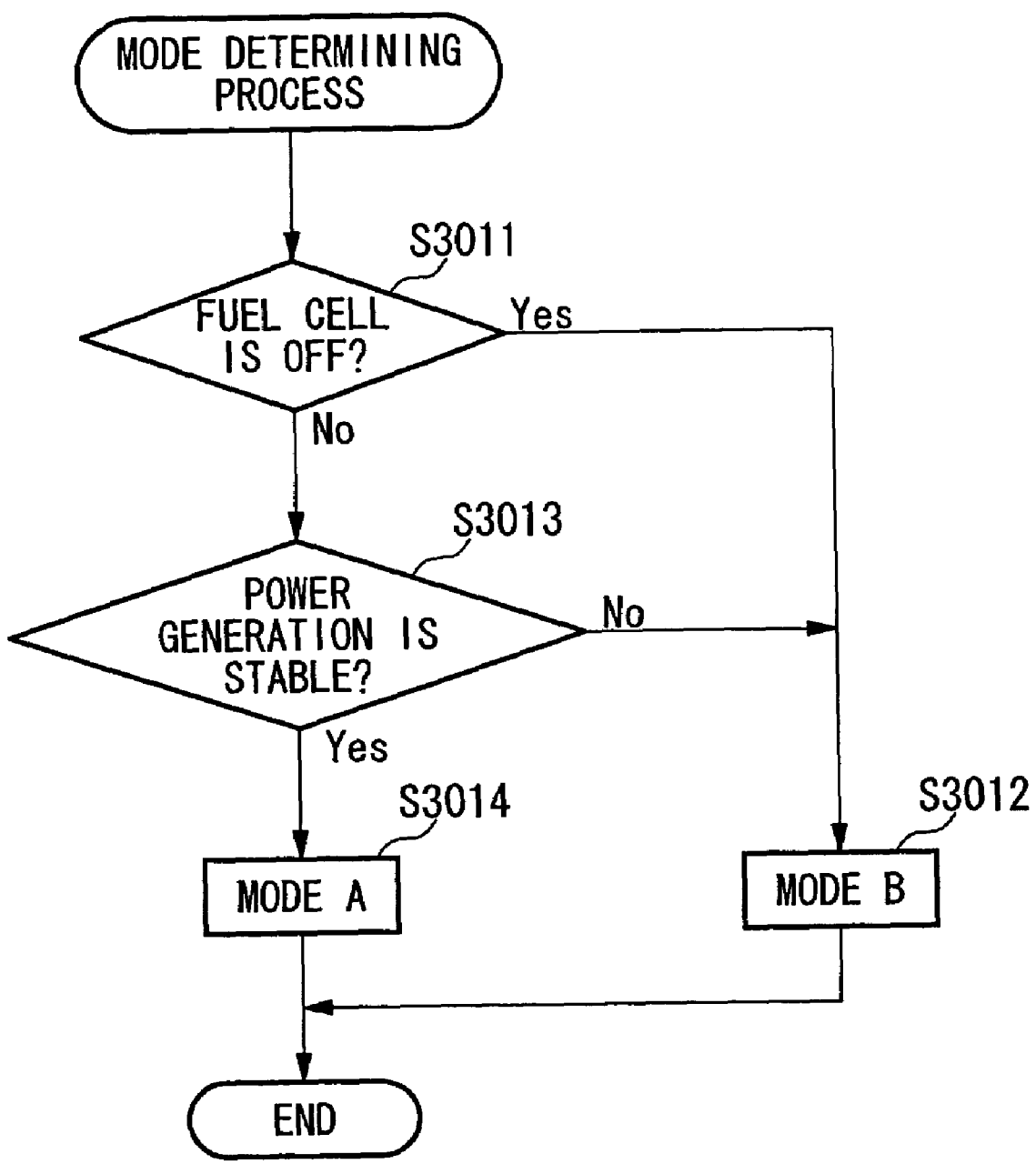
FIG. 10 is a flow chart illustrating a mode determining process in the third embodiment.
Figure 11:
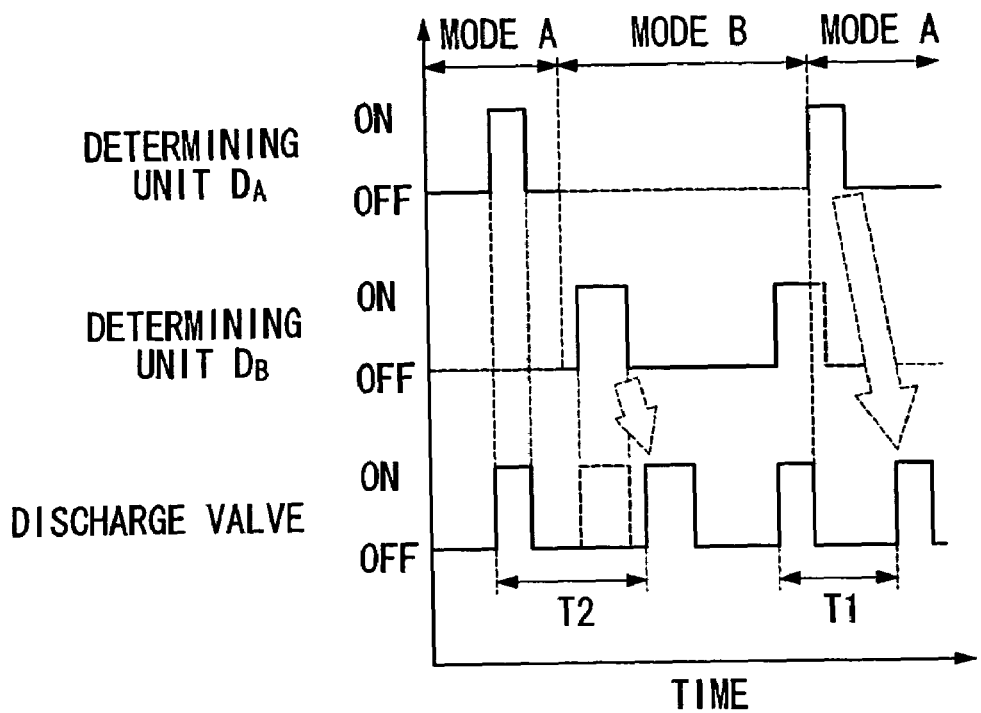
FIG. 11 is a timing chart of the third embodiment.

Next, the fuel cell system according to a third embodiment of the present invention will be explained with reference to FIGS. 9 to 11. Since the configuration of the discharge system in the third embodiment is the same as that in the first embodiment shown in FIG. 1, the discussion of the third embodiment is omitted.

The fuel cell system of the third embodiment differs from the first embodiment in that the determining unit used for the decision on whether or not discharge of impurities is selected between the determining unit $D_A$ and the determining unit $D_B$, and the selection is made according to a preset condition which indicates the operating status of the fuel cell 1.

More specifically, in the third embodiment, two determining units are selected based on modes indicating the operating status of the fuel cell 1: Modes A and B. Mode A indicates that power generation by the fuel cell 1 is stable, and Mode B indicates the situation other than Mode A. In Mode A, it is determined whether or not the determining unit $D_A$ has determined that discharge of impurities is necessary, and in Mode B, whether or not the determining unit $D_B$ has determined that discharge of impurities is necessary.

The flow of the impurities discharging process in the third embodiment will be explained with reference to the flow chart of FIG. 9.

First, a mode determining process is executed in step S301. The mode determining process is executed as a subroutine shown in the flow chart of FIG. 10. That is, it is first determined whether or not the fuel cell 1 is not operating (step S3011). If the decision made in step S3011 is "YES", i.e., the fuel cell 1 is not operating, the mode is set to Mode B (step S3012). If the decision made in step S3011 is "NO", i.e., the fuel cell 1 is operating, it is determined whether or not power generation in the fuel cell 1 is stable (step S3013). If the decision made in step S3013 is "NO", i.e., power generation is unstable, the mode is set to Mode B (step S3012), and if the decision made in step S3013 is "YES", i.e., power generation is stable, the mode is set to Mode A (step S3014).

It should be noted that the determination whether power generation is stable or not is made, for example, according to the temperature or the power generation load of the fuel cell 1. In such a case, the power generation is determined to be unstable if the temperature of the fuel cell 1 has been lower than a predetermined temperature, or if the power generation load of the fuel cell 1 has been low for a predetermined time period.

After the mode determining process is executed in step S301, the flow proceeds to step S302 in which it is determined that the mode is either Mode A or Mode B.

If the mode is determined as Mode A in step S302, the flow proceeds to step S303 in which it is determined whether or not the determining unit $D_A$ has determined that discharge of impurities is necessary and issued a command to open the discharge valve 21.

If the decision made in step S303 is "NO", i.e., an open command has not been issued by the determining unit $D_A$, the flow proceeds to step S304 in which the discharge valve 21 remains closed, and this routine ends.

If the decision made in step S303 is "YES", i.e., an open command has been issued by the determining unit $D_A$, the flow proceeds to step S305 in which it is determined whether or not the predetermined time period T1 has elapsed since the determining unit $D_B$ has determined that discharge of impurities is necessary and opened the discharge valve 21.

If the decision made in step S305 is "YES", i.e., the predetermined time period T1 has elapsed since the discharge valve 21 has been opened based on a decision made by the determining unit $D_B$, the flow proceeds to step S306 in which the discharge valve 21 is opened, and this routine ends. This means that in this case, the discharge valve 21 is opened and an impurities discharging process is executed immediately after it is determined by the determining unit $D_A$ that discharge of impurities is necessary.

On the other hand, if the decision made in step S305 is "NO", i.e., the predetermined time T1 has not elapsed since the discharge valve 21 has been opened based on a decision made by the determining unit $D_B$, the flow proceeds to step S304 in which the discharge valve 21 remains closed. That is, the discharge valve 21 is prevented from being opened, and this routine ends. In this case, as shown in the timing chart of FIG. 11, even if the determining unit $D_A$ determines that discharge of impurities is necessary, the discharge valve 21 is prevented from being opened until the predetermined time period T1 elapses after the discharge valve 21 has been opened based on a decision made by the determining unit $D_B$. The discharge valve 21 is allowed to be opened and an impurities discharging process is executed based on the decision made by the determining unit $D_A$ after the predetermined time period T1 elapses.

If the mode is determined as Mode B in step S302, the flow proceeds to step S307 and it is determined whether or not the determining unit $D_B$ has determined that discharge of impurities is necessary and issued a command to open the discharge valve 21.

If the decision made in step S307 is "NO", i.e., an open command has not been issued by the determining unit $D_B$, the flow proceeds to step S308 in which the discharge valve 21 remains closed, and this routine ends.

If the decision made in step S307 is "YES", i.e., an open command has been issued by the determining unit $D_B$, the flow proceeds to step S309 in which it is determined whether or not the predetermined time T2 has elapsed since the determining unit $D_A$ has determined that discharge of impurities is necessary and opened the discharge valve 21.

If the decision made in step S309 is "YES", i.e., the predetermined time T2 has elapsed since the discharge valve 21 has been opened based on a decision made by the determining unit $D_A$, the flow proceeds to step S310 in which the discharge valve 21 is opened, and this routine ends. This means that in this case, the discharge valve 21 is opened and an impurities discharging process is executed immediately after it is determined by the determining unit $D_B$ that discharge of impurities is necessary On the other hand, if the decision made in step S309 is "NO", i.e., the predetermined time T2 has not elapsed since the discharge valve 21 has been opened based on a decision made by the determining unit $D_A$, the flow proceeds to step S308 in which the discharge valve 21 remains closed. That is, the discharge valve 21 is prevented from being opened, and this routine ends. In this case, as shown in the timing chart of FIG. 11, even if the determining unit $D_B$ determines that discharge of impurities is necessary, the discharge valve 21 is prevented from being opened until the predetermined time period T2 elapses after the discharge valve 21 has been opened based on a decision made by the determining unit $D_A$. The discharge valve 21 is allowed to be opened and an impurities discharging process is executed based on the decision made by the determining unit $D_B$ after the predetermined time period T2 elapses.

Figure 9:
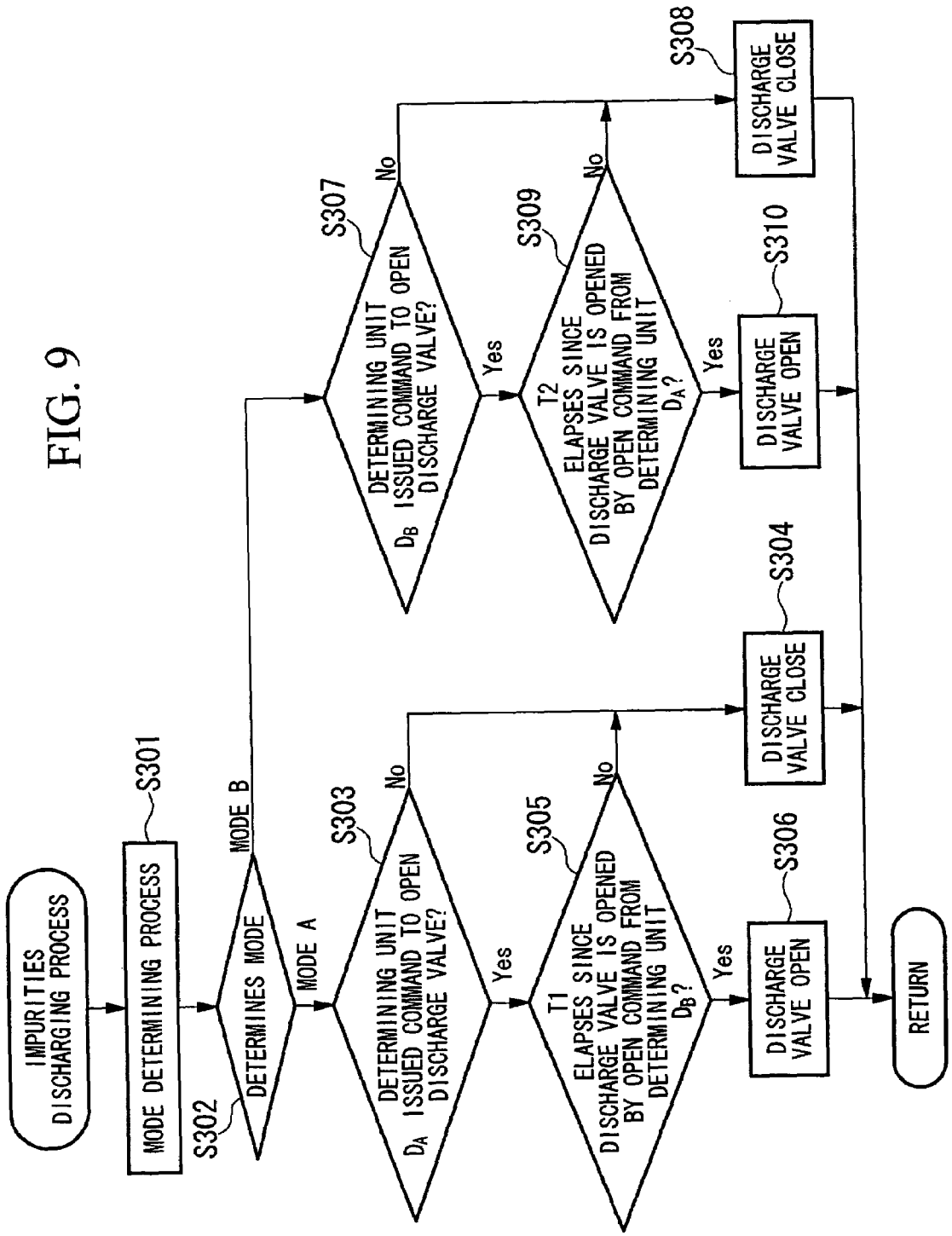
FIG. 9 is a flow chart illustrating an impurities discharging process according to the third embodiment of the present invention.
Figure 12:
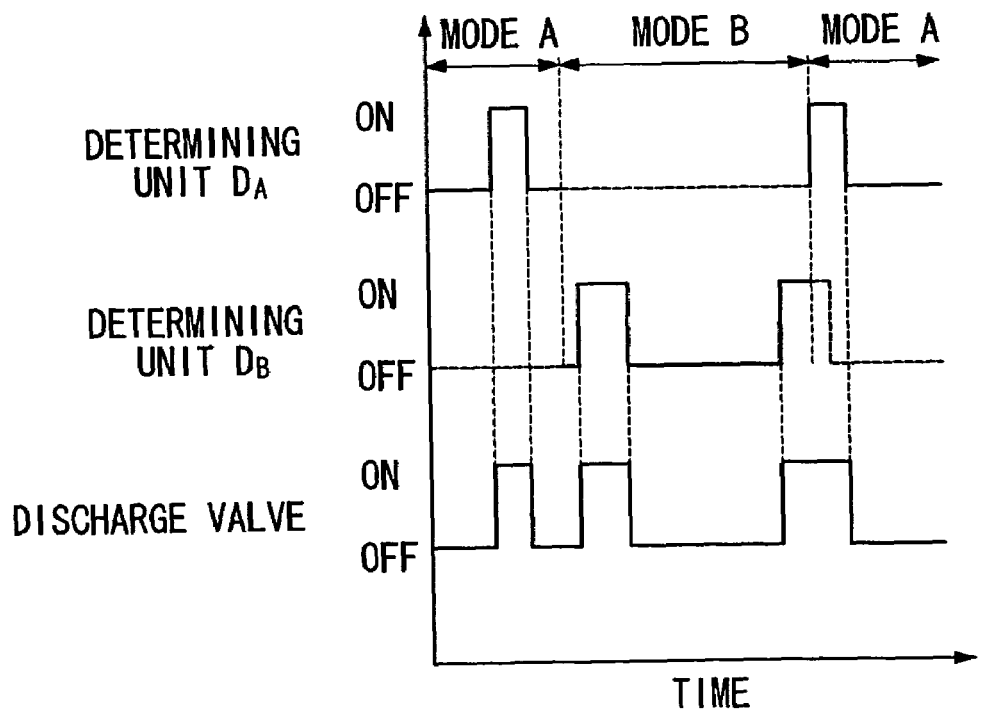
FIG. 12 is a timing chart of a comparative example of the third embodiment.

FIG. 12 is a timing chart of a comparative example of the flow chart shown in FIG. 9 in which the steps S305 and S309 are omitted. In this comparative example, since the impurities discharging process based on a decision made by the determining unit $D_A$ and the impurities discharging process based on a decision made by the determining unit $D_B$ are executed independently, an impurities discharging process may be executed in a short time after the previous impurities discharging process is completed, or impurities discharging processes may be continuously executed for a long time based on decisions made by the two determining units. Therefore, anode off-gas may be excessively discharged, resulting in a deteriorated efficiency of power generation, or an increased hydrogen gas may flow into the dilution device 11, which may cause an unstable hydrogen concentration after hydrogen is diluted.

According to the discharge system of the third embodiment, since excessive discharging of anode off-gas containing impurities can be prevented, the amount of hydrogen gas which has not been consumed in the power generation and is discharged together with the impurities can be reduced compared to the conventional methods, and the efficiency of power generation can be improved. Furthermore, since the amount of hydrogen gas flowing into the dilution device 11 can be optimized, it becomes possible to stabilize the hydrogen concentration after hydrogen is diluted.

In the third embodiment, because the ECU 30 executes the processing in step S303 or S307, two valve open control units which control opening of the discharge valve 21 can be realized.

Fourth Embodiment

Next, the fuel cell system according to a fourth embodiment of the present invention will be explained with reference to FIGS. 13 to 14. Since the configuration of the discharge system in the fourth embodiment is the same as that in the second embodiment of the fuel cell having the first and second discharge valves 21A and 21B shown in FIG. 2, the discussion of the third embodiment is omitted.

The fuel cell system of the third embodiment differs from the first embodiment in that the determining unit used for the decision on whether or not discharge of impurities is selected between the determining unit $D_A$ and the determining unit $D_B$, and the selection is made according to a preset condition which indicates the operating status of the fuel cell 1, as in the third embodiment.

More specifically, in the fourth embodiment, two determining units are selected based on modes indicating the operating status of the fuel cell 1: Modes A and B. Mode A indicates that power generation by the fuel cell 1 is stable, and Mode B indicates the situation other than Mode A. In Mode A, the determining unit $D_A$ makes the decision whether or not discharge of impurities is necessary, and in Mode B, the determining unit $D_B$ makes the decision whether or not discharge of impurities is necessary.

The flow of the impurities discharging process in the fourth embodiment will be explained with reference to the flow chart of FIG. 13.

First, a mode determining process is executed in step S401. Since this mode determining process is executed in the manner same as the third embodiment, a discussion thereof is omitted.

After the mode determining process is executed in step S401, the flow proceeds to step S402 in which it is determined that the mode is either Mode A or Mode B.

If the mode is determined as Mode A in step S402, the flow proceeds to step S403 in which it is determined whether or not the determining unit $D_A$ has determined that discharge of impurities is necessary and issued a command to open the first discharge valve 21A.

If the decision made in step S403 is "NO", i.e., an open command has not been issued by the determining unit $D_A$, the flow proceeds to step S404, the first discharge valve 21A remains closed, and this routine ends.

If the decision made in step S403 is "YES", i.e., an open command has been issued by the determining unit $D_A$, the flow proceeds to step S405 in which it is determined whether or not a predetermined time period T1 has elapsed since the determining unit $D_B$ has determined that discharge of impurities is necessary and opened the second discharge valve 21B.

If the decision made in step S405 is "YES", i.e., the predetermined time period T1 has elapsed since the second discharge valve 21B has been opened based on a decision made by the determining unit $D_B$, the flow proceeds to step S406, in which the first discharge valve 21A is opened, and this routine ends. This means that in this case, the first discharge valve 21A is opened and an impurities discharging process is executed immediately after it is determined by the determining unit $D_A$ that discharge of impurities is necessary.

On the other hand, if the decision made in step S405 is "NO", i.e., the predetermined time T1 has not elapsed since the second discharge valve 21B has been opened based on a decision made by the determining unit $D_B$, the flow proceeds to step S404 in which the first discharge valve 21A remains closed. That is, the first discharge valve 21A is prevented from being opened, and this routine ends. In this case, as shown in the timing chart of FIG. 14, even if the determining unit $D_A$ determines that discharge of impurities is necessary, the first discharge valve 21A is prevented from being opened until the predetermined time period T1 elapses after the second discharge valve 21B has been opened based on a decision made by the determining unit $D_B$. The first discharge valve 21A is allowed to be opened and an impurities discharging process is executed based on the decision made by the determining unit $D_A$ after the predetermined time period T1 elapses.

If the mode is determined as Mode B in step S402, the flow proceeds to step S407 and it is determined whether or not the determining unit $D_B$ has determined that discharge of impurities is necessary and issued a command to open the second discharge valve 21B.

If the decision made in step S407 is "NO", i.e., an open command has not been issued by the determining unit $D_B$, the flow proceeds to step S408, the flow proceeds to step S208, the second discharge valve 21B remains closed, and this routine ends.

If the decision made in step S407 is "YES", i.e., an open command has been issued by the determining unit $D_B$, the flow proceeds to step S409 in which it is determined whether or not the predetermined time T2 has elapsed since the determining unit $D_A$ has determined that discharge of impurities is necessary and opened the first discharge valve 21A.

If the decision made in step S409 is "YES", i.e., the predetermined time period T2 has elapsed since the first discharge valve 21A has been opened based on the decision made by the determining unit $D_A$, the flow proceeds to step S410 in which the second discharge valve 21B is opened, and this routine ends. This means that in this case, the second discharge valve 21B is opened and an impurities discharging process is executed immediately after it is determined by the determining unit $D_B$ that discharge of impurities is necessary.

On the other hand, if the decision made in step S409 is "NO", i.e., the predetermined time period T2 has not elapsed since the first discharge valve 21A has been opened based on the decision made by the determining unit $D_A$, the flow proceeds to step S408 in which the second discharge valve 21B remains closed. That is, the second discharge valve 21B is prevented from being opened, and this routine ends. In this case, as shown in the timing chart of FIG. 14, even if the determining unit $D_B$ determines that discharge of impurities is necessary, the second discharge valve 21B is prevented from being opened until a predetermined time period T2 elapses after the first discharge valve 21A has been opened based on a decision made by the determining unit $D_A$. The second discharge valve 21B is allowed to be opened and the impurities discharging process is executed based on a decision made by the determining unit $D_B$ after the predetermined time period T2 elapses.

Figure 13:
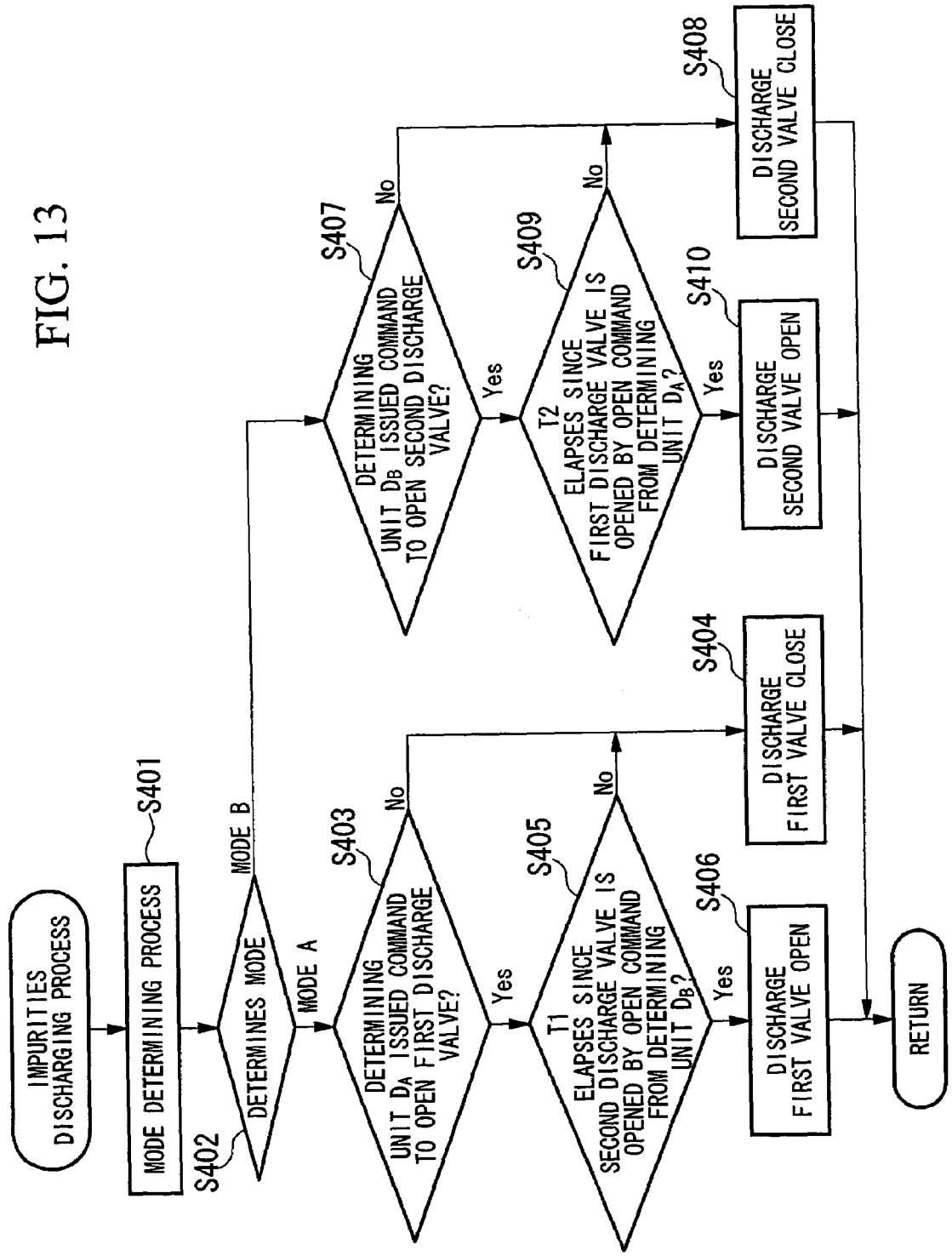
FIG. 13 is a flow chart illustrating an impurities discharging process according to the fourth embodiment of the present invention.
Figure 14:
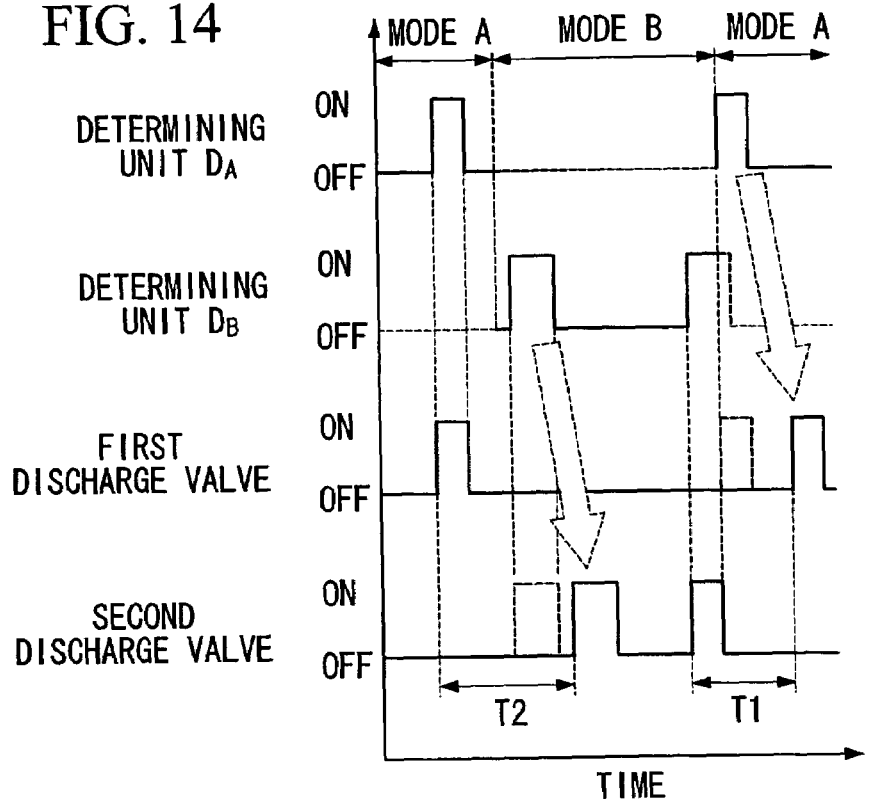
FIG. 14 is a timing chart of the fourth embodiment.
Figure 15:
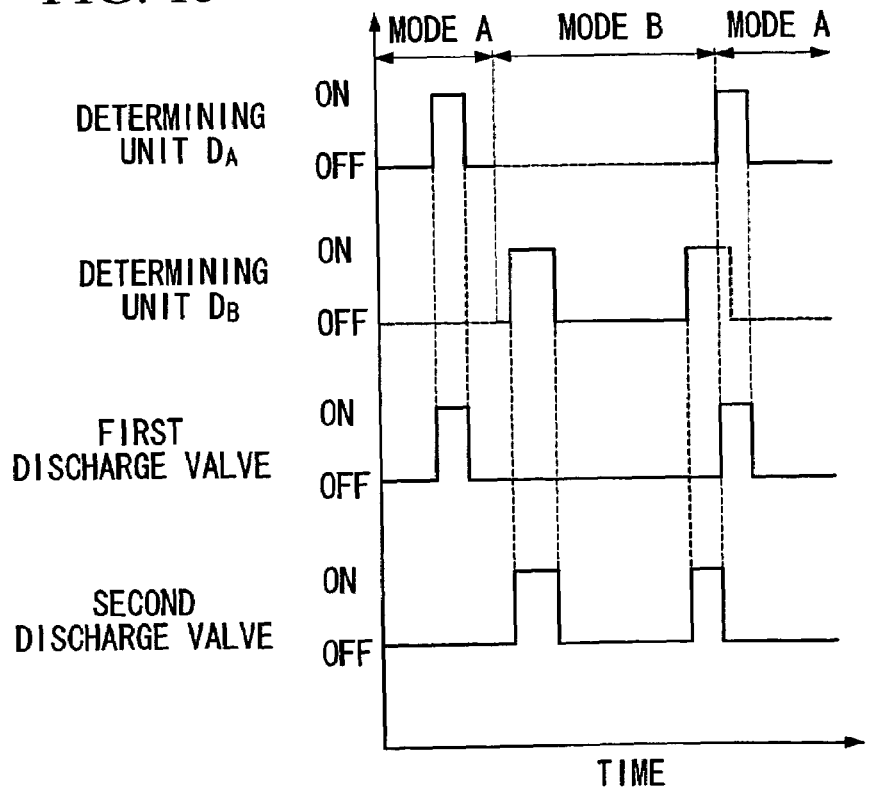
FIG. 15 is a timing chart of a comparative example of the fourth embodiment.

FIG. 15 is a timing chart of a comparative example of the flow chart shown in FIG. 13 in which the steps S405 and S409 are omitted. In this comparative example, since the impurities discharging process executed based on a decision made by the determining unit $D_A$ and the impurities discharging process executed based on a decision made by the determining unit $D_B$ are executed independently, an impurities discharging process using the second discharge valve 21B may be executed in a short time after an impurities discharging process using the first discharge valve 21A is completed, or an impurities discharging process using the first discharge valve 21A and an impurities discharging process using the second discharge valve 21B may executed sequentially. Therefore, anode off-gas may be excessively discharged, resulting in a deteriorated efficiency of power generation, or an increased hydrogen gas may flow into the dilution device 11, which may cause an unstable hydrogen concentration after hydrogen is diluted.

According to the discharge system of the fourth embodiment, since excessive discharging of anode off-gas containing impurities can be prevented, the amount of hydrogen gas which has not been consumed in the power generation and is discharged together with the impurities can be reduced compared to the conventional methods, and the efficiency of power generation can be improved. Furthermore, since the amount of hydrogen gas flowing into the dilution device 11 can be optimized, it becomes possible to stabilize the hydrogen concentration after hydrogen is diluted.

In this fourth embodiment, because the ECU 30 executes the process in step S403, a valve open control unit which controls opening of the first discharge valve 21A can be realized. At the same time, because the ECU 30 executes the process in step S407, another control unit which controls opening of the second discharge valve 21B can be realized.

In the first to fourth embodiments described above, the values of the predetermined time periods T1 and T2 may be the same, or may be different. Furthermore, the predetermined time periods T1 and T2 may be at least one constant. Alternatively, the predetermined time periods T1 and T2 may be calculated or corrected based on the flow-rate of the diluent gas supplied to the dilution device 11, i.e., the cathode off-gas, or a parameter for controlling the flow-rate (e.g., the output IFC of the generated power of the fuel cell 1 and the like). In addition, the predetermined time periods T1 and T2 may be calculated or corrected based on the flow-rate, the pressure or the temperature of hydrogen gas supplied to the anode 3 of the fuel cell 1, or the pressure downstream to the discharge valve 21, or a parameter for controlling them.

In the above-described embodiment, the valve open interval of the discharge valve 21, 21A and 21B can be set to an appropriate value according to the operating status of the fuel cell 1 by calculating or correcting the predetermined time periods T1 and T2 in this manner. Thus, excessive discharging of residual reaction gas containing impurities can be prevented in a more proper manner.

Fifth Embodiment

Figure 16:
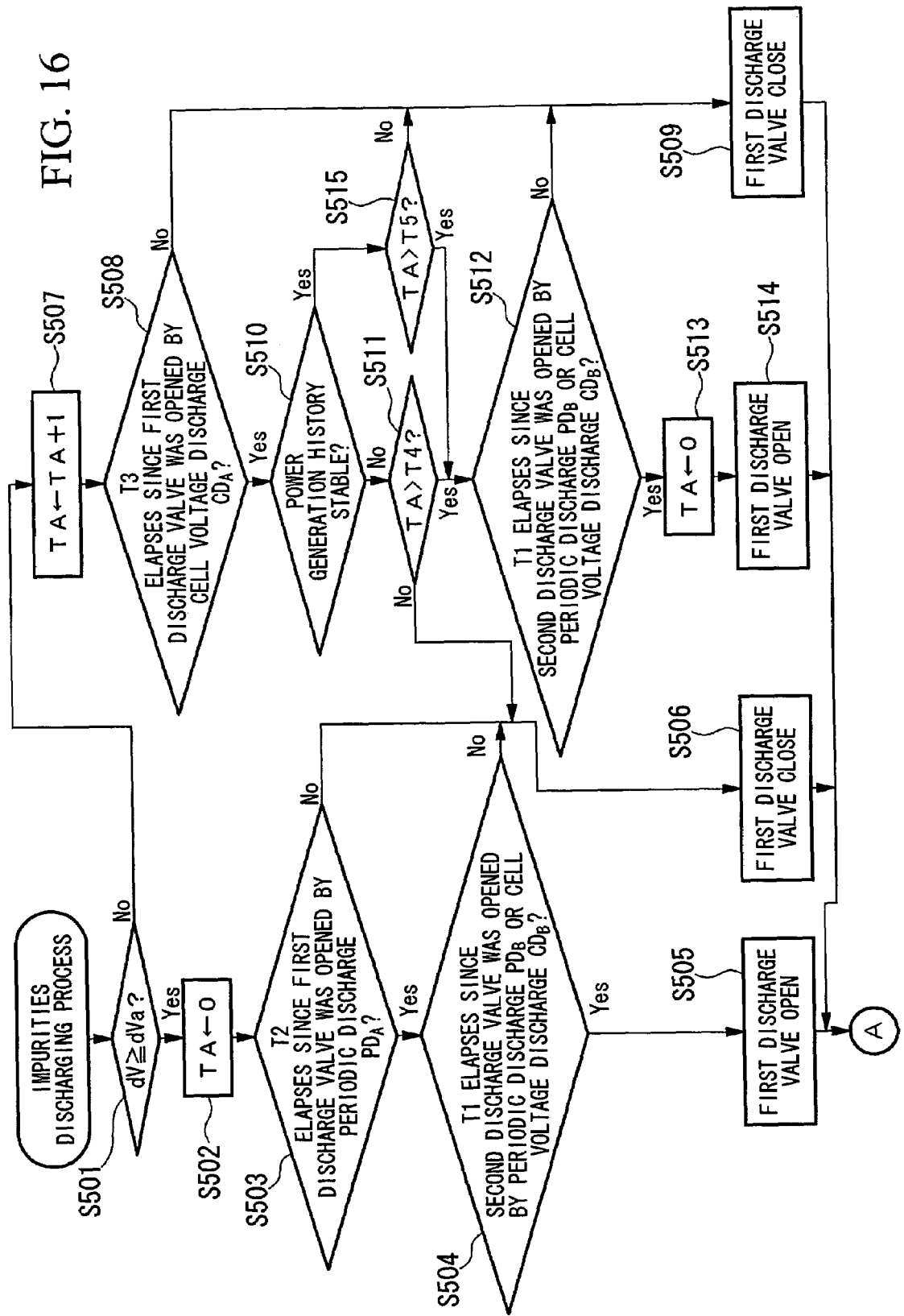
FIG. 16 is a flow chart illustrating an impurities discharging process according to the fifth embodiment of the present invention.
Figure 17:
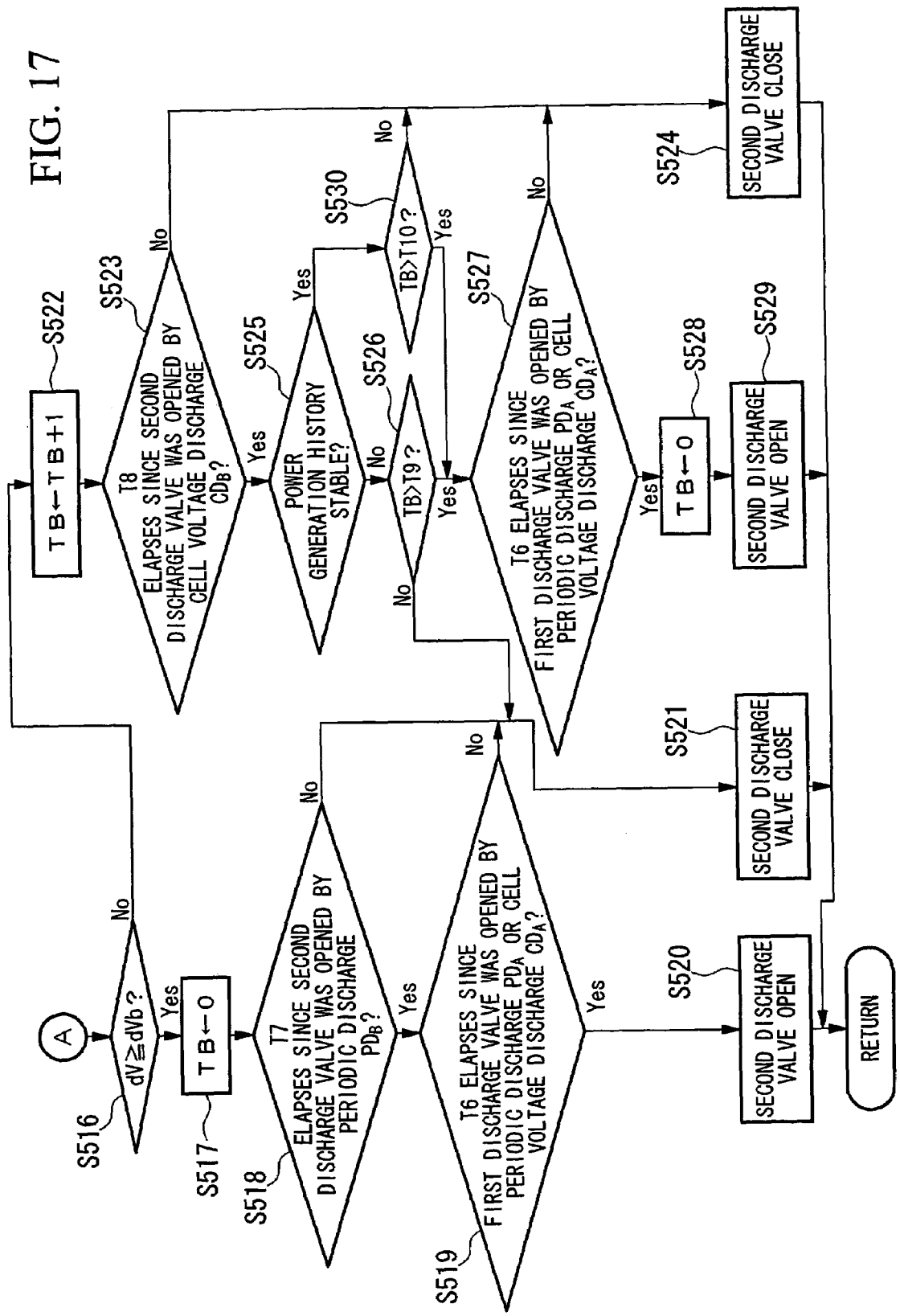
FIG. 17 is a flow chart illustrating an impurities discharging process (second example) according to the fifth embodiment of the present invention.
Figure 18:
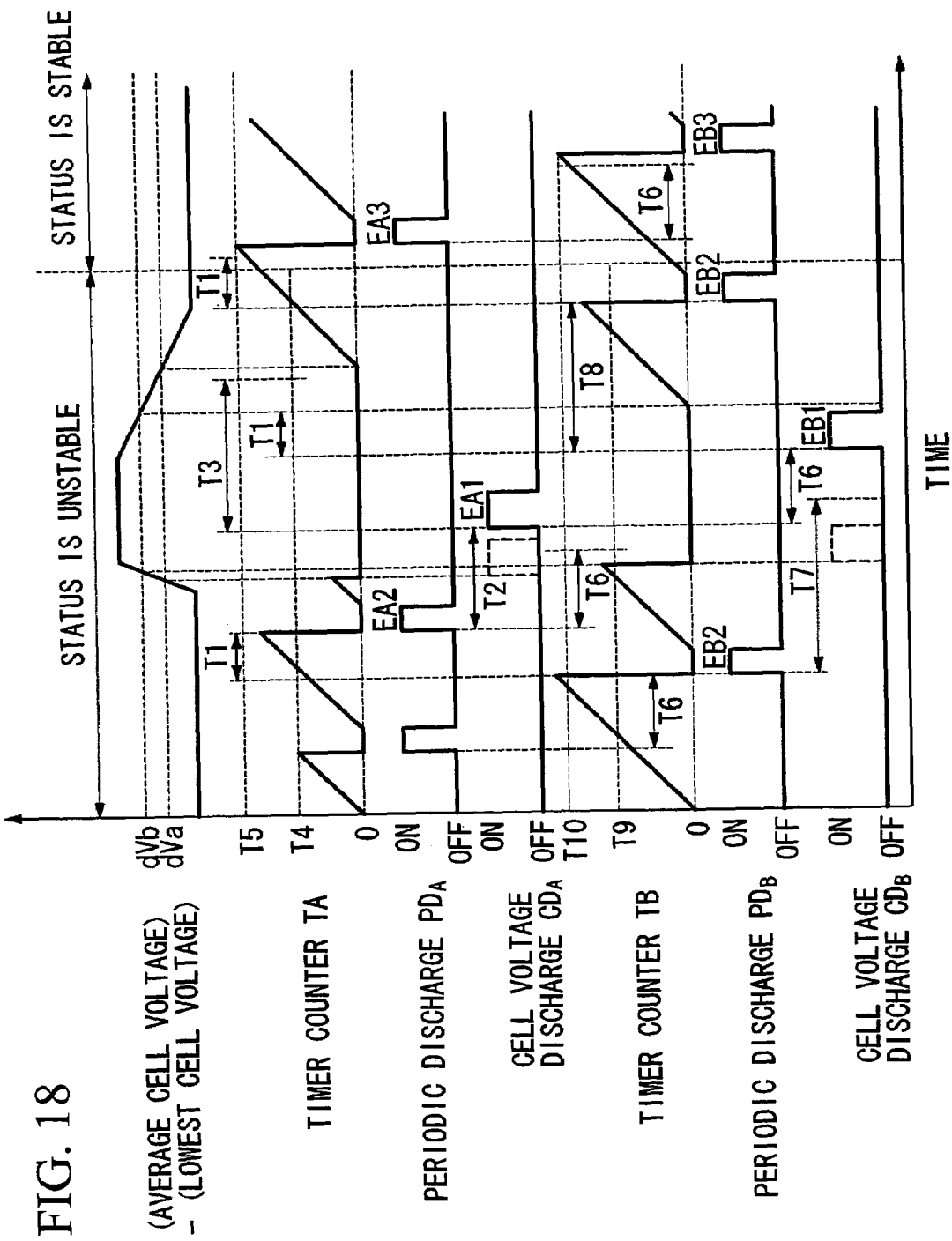
FIG. 18 is a timing chart of the fifth embodiment.

Next, the fuel cell system according to a fifth embodiment of the present invention will be explained with reference to FIGS. 16 to 18. Since the configuration of the discharge system in the fifth embodiment is the same as that in the second embodiment of the fuel cell having the first and second discharge valves 21A and 21B shown in FIG. 2, the discussion of the third embodiment is omitted.

The fuel cell system of the fifth embodiment differs from the above-described second embodiment in that the determination on whether it is required to open the first discharge valve 21A and to execute impurities discharging process is made based on a time factor and a power generation performance factor. In addition, in the fifth embodiment, the determination on whether it is required to open the second discharge valve 21B and execute impurities discharging process is also made based on the two factors.

In this embodiment, the determination on whether or not discharge of impurities is necessary (discharge valve open request) according to the time factor is based on whether or not the operating time of the fuel cell 1 exceeds a predetermined time period (time threshold). The determination on whether or not discharge of impurities is necessary (discharge valve open request) according to the power generation performance factor is based on a value obtained by subtracting the lowest cell voltage of cell voltage(s) of the at least one cell from the average cell voltage (hereinafter referred to as "cell voltage difference") is equal to or greater than a predetermined value (power generation performance threshold).

In the fifth embodiment, respective time thresholds are set for the first and second discharge valves 21A and 21B, and respective power generation performance thresholds are set for the first and second discharge valves 21A and 21B.

Next, the flow of the impurities discharging process in the fourth embodiment will be explained with reference to the flow charts of FIGS. 16 and 17.

In the following description, a discharge of impurities via the first discharge valve 21A according to the determination whether or not to open discharge valve based on the time factor to discharge impurities is referred to as "periodic discharge PDA," and a discharge of impurities via the first discharge valve 21A according to the determination whether or not to open discharge valve based on power generation performance factor to discharge impurities is referred to as "cell voltage discharge $CD_A$." Similarly, a discharge of the second discharge valve 21B according to the determination whether or not to open discharge valve based on the time factor to discharge impurities is referred to as "periodic discharge $PD_B$," and a discharge of impurities via the second discharge valve 21B according to the determination whether or not to open discharge valve based on power generation performance factor to discharge impurities is referred to as "cell voltage discharge $CD_B$."

First, in the step S501, it is determined whether or not the cell voltage difference dV is equal to or greater than the first threshold dVa.

If the decision made in step S501 is "YES", i.e., dV≧dVa, the flow proceeds to step S502 in which a timer A is reset (TA←0). Then the flow proceeds to step S503 in which it is determined whether or not a predetermined time period T2 has elapsed since the first discharge valve 21A has been opened by a periodic discharge $PD_A$.

If the decision made in step S503 is "YES", i.e., the predetermined time period T2 has elapsed since the first discharge valve 21A has been opened by a periodic discharge $PD_A$, the flow proceeds to step S504 in which it is determined whether or not a predetermined time period T1 has elapsed since the second discharge valve 21B has been opened by a periodic discharge $PD_B$ or a cell voltage discharge $CD_B$.

If the decision made in step S504 is "YES", i.e., the predetermined time T1 has elapsed since the second discharge valve 21B has been opened, the process proceeds to step S505 in which the first discharge valve 21A is opened. This means that in this case, the first discharge valve 21A is opened and an impurities discharging process is executed soon after it is determined that the cell voltage difference dV is equal to or greater than the first threshold dVa and discharge of impurities have been requested.

On the other hand, if the decision made in step S503 is "NO", i.e., the predetermined time period T2 has not elapsed since the first discharge valve 21A has been opened by the last periodic discharge $PD_A$, or if the decision made in step S504 is "NO", i.e., the predetermined time period T1 has not elapsed since the second discharge valve 21B has been opened, the flow proceeds to step S506 in which the first discharge valve 21A remains closed. That is, the first discharge valve 21A is prevented from being opened. In this case, as indicated by EA1 in the timing chart of FIG. 18, even if it is determined that opening of the first discharge valve 21A has been requested due to an increase in the cell voltage difference dV, the first discharge valve 21A is prevented from being opened until the predetermined time period T2 elapses since the first discharge valve 21A is opened by a periodic discharge $PD_A$, and a predetermined time period T1 elapses since the second discharge valve 21B is opened by a periodic discharge $PD_B$ or a cell voltage discharge $CD_B$. The first discharge valve 21A is allowed to be opened after the predetermined time periods T1 and T2 elapse, and an impurities discharging process is executed by a cell voltage discharge $CD_A$.

If the decision made in step S501 is "NO", i.e., dV<dVa, the flow proceeds to step S507 in which the timer A is incremented (TA←TA+1), and an elapsed time TA since a periodic discharge $PD_A$ has been completed is counted.

Next, the flow proceeds to step S508 in which it is determined whether or not a predetermined time period T3 has elapsed since the first discharge valve 21A has been opened by a cell voltage discharge $CD_A$.

If the decision made in step S508 is "NO", i.e., the predetermined time period T3 has not elapsed since the first discharge valve 21A has been opened by a cell voltage discharge $CD_A$, the flow proceeds to step S509 in which the first discharge valve 21A remains closed.

If the decision made in step S508 is "YES", i.e., the predetermined time period T3 has elapsed since the first discharge valve 21A has been opened by a cell voltage discharge $CD_A$, the flow proceeds to step S510 in which it is determined whether the power generation history in the fuel cell 1 is stable or not. It should be noted that the determination whether power generation history is stable or not is made, for example, according to the temperature or the power generation load of the fuel cell 1. In such a case, the power generation history is determined to be unstable if the temperature of the fuel cell 1 has been lower than a predetermined temperature, or if the power generation load of the fuel cell 1 has been low for a predetermined time period.

If the decision made in step S510 is "NO", i.e., the power generation history is unstable, the flow proceeds to step S511 in which it is determined whether or not the elapsed time TA measured by the timer A exceeds predetermined time period T4.

If the decision made in step S511 is "NO", i.e., TA<T4, the flow proceeds to step S506 in which the first discharge valve 21A remains closed.

On the other hand, if the decision made in step S511 is "YES", i.e., TA>T4, the flow proceeds to step S512 in which it is determined whether or not the predetermined time T1 has elapsed since the second discharge valve 21B has been opened by a periodic discharge $PD_B$ or a cell voltage discharge $CD_B$.

If the decision made in step S512 is "NO", i.e., the predetermined time period T1 has not elapsed since the second discharge valve 21B has been opened by a periodic discharge $PD_B$ or a cell voltage discharge $CD_B$, the flow proceeds to step S509 in which the first discharge valve 21A remains closed.

If the decision made in step S512 is "YES", i.e., the predetermined time period T1 has elapsed since the second discharge valve 21B has been opened by a periodic discharge $PD_B$ or a cell voltage discharge $CD_B$, the flow proceeds to step S513 in which the timer A is reset (TA←0). Furthermore, the flow proceeds to step S514 in which the first discharge valve 21A is opened and an impurities discharging process is executed by a periodic discharge $PD_A$. That is, when the power generation history is unstable, an interval between periodic discharges A is equal to or greater than T4. The periodic discharge $PD_A$ in this case is indicated by EA2 in the timing chart of FIG. 18.

If the decision made in step S510 is "YES", i.e., the power generation history is stable, the flow proceeds to step S515 in which it is determined whether or not the elapsed time TA measured by the timer A exceeds a predetermined time period T5.

If the decision made in step S515 is "NO", i.e., TA≦T5, the flow proceeds to step S509 in which the first discharge valve θ A remains closed.

On the other hand, if the decision made in step S515 is "YES", i.e., TA>T5, the flow proceeds to step S512 in which it is determined whether or not the predetermined time T1 has elapsed since the second discharge valve 21B has been opened by a periodic discharge $PD_B$ or a cell voltage discharge $CD_B$.

If the decision made in step S512 is "NO", i.e., the predetermined time period T1 has not elapsed since the second discharge valve 21B has been opened by a periodic discharge $PD_B$ or a cell voltage discharge $CD_B$, the flow proceeds to step S509 in which the first discharge valve 21A remains closed.

If the decision made in step S512 is "YES", i.e., the predetermined time period T1 has elapsed since the second discharge valve 21B has been opened by a periodic discharge $PD_B$ or a cell voltage discharge $CD_B$, the flow proceeds to step S513 in which the timer A is reset (TA←0). Furthermore, the flow proceeds to step S514 in which the first discharge valve 21A is opened and an impurities discharging process is executed by a periodic discharge $PD_A$. That is, if the power generation history is stable, an interval between periodic discharges A is equal to or greater than T5. The periodic discharge $PD_A$ in this case is indicated by EA3 in the timing chart of FIG. 18.

It should be noted that the values of the predetermined time periods T4 and T5 are selected so that multiple periodic discharges $PD_A$ are not executed sequentially irrespective of the decision whether or not the power generation history is stable.

After the processes of the steps S505, 506, 509 and 514 are executed, the flow proceeds to step S516 in which it is determined whether or not the cell voltage difference dV is equal to or greater than a second threshold dVb.

If the decision made in step S516 is "YES", i.e., dV≧dVb, the flow proceeds to step S517 in which the timer B is reset (TB←0). Then the process proceeds to step S518 in which it is determined whether or not a predetermined time period T7 has elapsed since the second discharge valve 21B has been opened by a periodic discharge PDB.

If the decision made in step S518 is "YES", i.e., the predetermined time period T7 has elapsed since the second discharge valve 21B has been opened by a periodic discharge $PD_B$, the flow proceeds to step S519 in which it is determined whether or not a predetermined time period T6 has elapsed since the first discharge valve 21A has been opened by a periodic discharge $PD_A$ or a cell voltage discharge $CD_A$.

If the decision made in step S519 is "YES", i.e., the predetermined time T6 has elapsed since the first discharge valve 21A has been opened, the process proceeds to step S520 in which the second discharge valve 21B is opened. This means that in this case, the second discharge valve 21B is opened and an impurities discharging process is executed soon after it is determined that the cell voltage difference dV is equal to or greater than the second threshold dVb and discharge of impurities have been requested.

On the other hand, if the decision made in step S518 is "NO", i.e., the predetermined time period T7 has not elapsed since the second discharge valve 21B is opened by a periodic discharge $PD_B$, or if the decision made in step S519 is "NO", i.e., the predetermined time period T6 has not elapsed since the first discharge valve 21A has been opened, the flow proceeds to step S521 in which the second discharge valve 21B remains closed. That is, the second discharge valve 21B is prevented from being opened. In this case, as indicated by EB1 in the timing chart of FIG. 18, even if it is determined that opening of the second discharge valve 21B has been requested due to an increase in the cell voltage difference dV, the second discharge valve 21B is prevented from being opened until the predetermined time period T7 elapses since the second discharge valve 21B is opened by a periodic discharge $PD_B$, and a predetermined time period T6 elapses since the first discharge valve 21A is opened by a periodic discharge $PD_A$ or a cell voltage discharge $CD_A$. Opening of the second discharge valve 21B is allowed after the predetermined time periods T6 and T7 elapse, and an impurities discharging process is executed by a cell voltage discharge $CD_B$.

Furthermore, if the decision made in step S516 is "NO", i.e., dV<dVb, the flow proceeds to step S522 in which a timer B is incremented (TB←TB+1), and an elapsed time TB since a periodic discharge $PD_B$ has been completed is counted.

Next, the flow proceeds to step S523 in which it is determined whether or not a predetermined time period T8 elapses since the second discharge valve 21B has been opened by a cell voltage discharge $CD_B$.

If the decision made in step S523 is "NO", i.e., the predetermined time period T8 has not elapsed since the second discharge valve 21B has been opened by a cell voltage discharge $CD_B$, the flow proceeds to step S524 in which the second discharge valve 21B remains closed.

If the decision made in step S523 is "YES", i.e., the predetermined time period T8 has elapsed since the second discharge valve 21B has been opened by a cell voltage discharge $CD_B$, the flow proceeds to step S525 in which it is determined whether the power generation history in the fuel cell 1 is stable or not. A criterion of the decision whether or not the power generation history is stable or not is the same as that in step S510.

If the decision made in step S525 is "NO", i.e., the power generation history is unstable, the flow proceeds to step S526 in which it is determined whether or not the elapsed time TB measured by the timer B exceeds a predetermined time period T9.

If the decision made in step S526 is "NO", i.e., TB≦T9, the flow proceeds to step S521 in which the second discharge valve 21B remains closed.

On the other hand, if the decision made in step S526 is "YES", i.e., TA>T9, the flow proceeds to step S527 in which it is determined whether or not the predetermined time period T6 has elapsed since the first discharge valve 21A has been opened by a periodic discharge $PD_A$ or a cell voltage discharge $CD_A$.

If the decision made in step S527 is "NO", i.e., the predetermined time period T6 has not elapsed since the first discharge valve 21A has been opened by a periodic discharge $PD_A$ or a cell voltage discharge $CD_A$, the flow proceeds to step S524 in which the second discharge valve 21B remains closed.

If the decision made in step S527 is "YES", i.e., the predetermined time period T6 has elapsed since the first discharge valve 21A has been opened by a periodic discharge $PD_A$ or a cell voltage discharge $CD_A$, the flow proceeds to step S528 in which the timer B is reset (TB←0). Furthermore, the flow proceeds to step S529 in which the second discharge valve 21B is opened and an impurities discharging process is executed by a periodic discharge $PD_B$. That is, when the power generation history is unstable, an interval between periodic discharges B is equal to or greater than T9. The periodic discharge $PD_B$ in this case is indicated by EB2 in the timing chart of FIG. 18.

If the decision made in step S525 is "NO", i.e., the power generation history is stable, the flow proceeds to step S530 in which it is determined whether or not the elapsed time TB measured by the timer B exceeds a predetermined time period T10.

If the decision made in step S530 is "NO", i.e., TB≦T10, the flow proceeds to step S524 in which the second discharge valve 21B remains closed.

On the other hand, if the decision made in step S530 is "YES", i.e., TA>T10, the flow proceeds to step S527 in which it is determined whether or not the predetermined time period T6 has elapsed since the first discharge valve 21A has been opened by a periodic discharge $PD_A$ or a cell voltage discharge $CD_A$.

If the decision made in step S527 is "NO", i.e., the predetermined time period T6 has not elapsed since the first discharge valve 21A has been opened by a periodic discharge $PD_A$ or a cell voltage discharge $CD_A$, the flow proceeds to step S524 in which the second discharge valve 21B remains closed.

If the decision made in step S527 is "YES", i.e., the predetermined time period T6 has elapsed since the first discharge valve 21A has been opened by a periodic discharge $PD_A$ or a cell voltage discharge $CD_A$, the flow proceeds to step S528 in which the timer B is reset (TB←0). Furthermore, the flow proceeds to step S529 in which the second discharge valve 21B is opened and an impurities discharging process is executed by a periodic discharge $PD_B$. That is, when the power generation history is stable, an interval between periodic discharges B is equal to or greater than T0. The periodic discharge $PD_B$ in this case is indicated by EB3 in the timing chart of FIG. 18.

It should be noted that the values of the predetermined time periods T9 and T10 are selected so that multiple periodic discharges $PD_B$ are not executed sequentially irrespective of the decision whether or not the power generation history is stable.

In the fifth embodiment, even if periodic discharge $PD_A$ or a cell voltage discharge $CD_A$ is requested, the first discharge valve 21A is prevented from being opened until the predetermined time period T1 has not elapsed since the second discharge valve 21B has been opened. A periodic discharge $PD_A$ or a cell voltage discharge $CD_A$ is not executed and the execution thereof is awaited.

In addition, even if the predetermined time period T1 has elapsed since the second discharge valve 21B has been opened, the first discharge valve 21A is prevented from being opened and a cell voltage discharge $CD_A$ is prevented from being executed until the predetermined time period T2 has elapsed since the first discharge valve 21A has been opened by a periodic discharge $PD_A$. Furthermore, the first discharge valve 21A is prevented from being opened and the periodic discharge $PD_A$ is prevented from being executed until the predetermined time period T3 has elapsed since the first discharge valve 21A has been opened by a cell voltage discharge $CD_A$.

Even if periodic discharge $PD_B$ or cell voltage discharge $CD_B$ is requested, the second discharge valve 21B is prevented from being opened and periodic discharge $PD_B$ or cell voltage discharge $CD_B$ is prevented from being executed until the predetermined time period T6 has not elapsed since the first discharge valve 21A has been opened. Periodic discharge B or cell voltage discharge $CD_B$ is not executed and the execution thereof is awaited.

In addition, even if the predetermined time period T6 has elapsed since the first discharge valve 21A has been opened, the second discharge valve 21B is prevented from being opened and cell voltage discharge $CD_B$ is prevented from being executed until the predetermined time period T7 has elapsed since the second discharge valve 21B has been opened by a periodic discharge $PD_B$. Furthermore, the second discharge valve 21B is prevented from being opened and the periodic discharge $PD_B$ is prevented from being executed until the predetermined time period T8 has elapsed since the second discharge valve 21B is opened by a cell voltage discharge $CD_B$.

Thus, according to the discharge system of the fifth embodiment, since excessive discharging of anode off-gas containing impurities can be prevented, the amount of hydrogen gas which has not been consumed in the power generation and is discharged together with the impurities can be reduced compared to the conventional methods, and the efficiency of power generation can be improved. Furthermore, since the amount of hydrogen gas flowing into the dilution device 11 can be optimized, it becomes possible to stabilize the hydrogen concentration after hydrogen is diluted.

In this fifth embodiment, because the ECU 30 executes the processes in the steps S501, S511 and S515, a valve open control unit which controls opening of the first discharge valve 21A can be realized. At the same time, because the ECU 30 executes the processes in the steps S516, S526 and S530, another control unit which controls opening of the second discharge valve 21B can be realized.

In the fifth embodiment described above, the values of the predetermined time periods T1 and T6 may be the same, or may be different. Furthermore, the predetermined time periods T1 and T6 may be at least one constant. Alternatively, the predetermined time periods T1 and T6 may be calculated or corrected based on the flow-rate of the diluent gas supplied to the dilution device 11, i.e., the cathode off-gas, or a parameter for controlling the flow-rate (e.g., the output IFC of the generated power of the fuel cell 1 and the like). In addition, the predetermined time periods T1 and T6 may be calculated or corrected based on the flow-rate, the pressure or the temperature of hydrogen gas supplied to the anode 3 of the fuel cell 1, or the pressure downstream to the discharge valves 21A and 21B, or a parameter for controlling them.

By calculating or correcting the predetermined time periods T1 and T6 in this manner, a valve open intervals of the first and second discharge valve 21A and 21B can be set to appropriate values according to the operating status of the fuel cell 1. Thus, excessive discharging of residual reaction gas containing impurities can be prevented in a more proper manner.

This applies to the predetermined time period T2 and T3, or the predetermined time periods T4 and T5, or the predetermined time period T7 and, T8, or predetermined time period T9 and T10.

In the present invention, the residual reaction gas which is discharged from the discharge valve of which opening is controlled is anode off-gas in the embodiments described above. In a fuel cell system in which cathode off-gas is the residual reaction gas discharged from the cathode and circulated again to the cathode, however, the residual reaction gas which is discharged from the discharge valve of which opening is controlled may be cathode off-gas.

Furthermore, the fuel gas used in the present invention is not limited to pure hydrogen gas; rather, hydrogen-rich gas which is generated by modifying fuel containing hydrocarbon may be used as fuel gas.

The fuel cell system of the present invention is not limited to ones which are carried in a fuel cell vehicle as the above-described embodiments, and the present invention may be applicable to a stationary-type fuel cell system.

In addition, the determining units A and B and Modes A and B are not limited to the those of the above-described embodiments, a determining unit which makes decisions based on other criteria, or other types of modes can be used as long as a plurality of valve open control units are used.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell system comprising:
a fuel cell which generates electrical power from a chemical reaction of a reaction gas;
a discharge path for discharging the reaction gas supplied to the fuel cell;
a discharge valve which is provided in the discharge path and discharges the reaction gas from the discharge path; and
valve control units for controlling opening of the discharge valve,
wherein the valve control units are programmed such that, since the discharge valve has been opened by a valve open command issued by one of the valve control units, the valve control units prohibit the discharge valve from being opened by a valve open command issued by any of the other valve control units until a predetermined time period elapses; and
wherein the predetermined time period is determined by a parameter which indicates a status of the reaction gas to be discharged from the discharge valve.

2. The fuel cell system according to claim 1, wherein each of the valve control units comprises a first valve open command control unit which issues a valve open command at a predetermined time interval and a second valve open command control unit which issues a valve open command when it is determined that stability of the power generation in the fuel cell has decreased.

3. The fuel cell system according to claim 2, wherein the fuel cell comprises fuel cell units, and the second valve open command control unit is adapted to determine that the stability of the power generation in the fuel cell has decreased when the lowest voltage among the fuel cell voltages of the fuel cell units falls below a predetermined lower-limit voltage.

4. The fuel cell system according to claim 1, wherein each of the valve control units comprises a first valve open command control unit which issues a valve open command when it is determined that the power generation in the fuel cell is stable and a second valve open command control unit which issues a valve open command when it is determined that stability of the power generation in the fuel cell has decreased.

5. A fuel cell system comprising:
a fuel cell which generates electrical power from a chemical reaction of a reaction gas;
a discharge path for discharging the reaction gas supplied to the fuel cell;
a first discharge valve and a second discharge valve which are provided in the discharge path and discharge the reaction gas from the discharge path; and
a first discharge valve control unit for controlling opening of the first discharge valve; and
a second discharge valve control unit for controlling opening of the second discharge valve; and
wherein the first discharge valve control unit is programmed to prohibit the first discharge valve from being opened until a first predetermined time period elapses since at least one of the first discharge valve and the second discharge valve has been opened, and the second discharge valve control unit is programmed to prohibit the second discharge valve from being opened until a second predetermined time period elapses since at least one of the first discharge valve and the second discharge valve has been opened.

6. A method for discharging a reaction gas from a fuel cell which comprises a discharge valve and valve control units, comprising the steps of:
opening the discharge valve by issuing a valve open command from one of the valve control units; and
prohibiting the discharge valve from being opened by a valve open command issued by any of the other valve control units until a predetermined time period elapses since the discharge valve has been opened by the valve open command issued by the one of the valve control units; and
determining the predetermined time period by a parameter which indicates a status of the reaction gas to be discharged from the discharge valve.

7. The method according to claim 6, wherein each of the valve control units comprises a first valve open command control unit which issues a valve open command at a predetermined time interval and a second valve open command control unit which issues a valve open command when it is determined that siability of the power generation in the fuel cell has decreased.

8. The method according to claim 7, wherein the fuel cell comprises fuel cell units, and the second valve open control unit is adapted to determine that the stability of the power generation in the fuel cell has decreased when the lowest voltage among the fuel cell voltages of the fuel cell units falls below a predetermined lower-limit voltage.

9. The method according to claim 6, wherein each of the valve control units comprises a first valve open command control unit which issues a valve open command when it is determined that the power generation in the fuel cell is stable and a second valve open command control unit which issues a valve open command when it is determined that stability of the power generation in the fuel cell has decreased.

* * * * *